United States Patent
Yasui et al.

(10) Patent No.: US 8,412,433 B2
(45) Date of Patent: Apr. 2, 2013

(54) MOTION CONTROL DEVICE FOR VEHICLE

(75) Inventors: Yoshiyuki Yasui, Nagoya (JP); Keita Nakano, Hamamatsu (JP); Yosuke Kuki, Kariya (JP); Takayuki Miyajima, Anjo (JP); Yoshito Kondo, Okazaki (JP); Atsushi Takeuchi, Nagoya (JP)

(73) Assignees: Advics Co., Ltd., Kariya, Aichi-Pref. (JP); Aisin AW Co., Ltd., Anjo-Shi, Aichi (JP)

( * ) Notice: Subject to any disclaimer, the term of this patent is extended or adjusted under 35 U.S.C. 154(b) by 955 days.

(21) Appl. No.: 12/362,229

(22) Filed: Jan. 29, 2009

(65) Prior Publication Data

US 2009/0198426 A1    Aug. 6, 2009

(30) Foreign Application Priority Data

Jan. 31, 2008 (JP) ................. 2008-021627

(51) Int. Cl.
  *G06F 17/00* (2006.01)
(52) U.S. Cl. ............ 701/79; 303/146; 303/167; 701/36; 701/65; 701/70; 477/120; 180/197
(58) Field of Classification Search .................. 303/146, 303/167; 701/36, 65, 70; 477/120; 180/197
See application file for complete search history.

(56) References Cited

U.S. PATENT DOCUMENTS

| | | | | |
|---|---|---|---|---|
| 5,829,847 A | * | 11/1998 | Tozu et al. | 303/167 |
| 5,947,221 A | * | 9/1999 | Taniguchi et al. | 180/197 |
| 6,106,434 A | * | 8/2000 | Ibamoto et al. | 477/120 |
| 6,208,927 B1 | | 3/2001 | Mine et al. | |
| 6,278,929 B1 | * | 8/2001 | Tozu et al. | 701/70 |
| 6,311,120 B1 | | 10/2001 | Asada | |
| 7,104,615 B2 | * | 9/2006 | Kato et al. | 303/146 |

(Continued)

FOREIGN PATENT DOCUMENTS

AU    200027641 B2    11/2000
CN    1623818 A    6/2005

(Continued)

OTHER PUBLICATIONS

Search Report dated Feb. 22, 2011, issued by the European Patent Office in corresponding European Patent Application No. 09 001 192.5.

(Continued)

*Primary Examiner* — James Trammell
*Assistant Examiner* — Sanjeev Malhotra
(74) *Attorney, Agent, or Firm* — Buchanan Ingersoll & Rooney PC

(57) ABSTRACT

A motion control device for a vehicle includes a vehicle speed obtaining device, a curvature obtaining device for obtaining a bending grade of a curve existing ahead of the vehicle, a position obtaining device for obtaining a relative position between the vehicle and the curve, a determination device for determining an appropriate vehicle speed for the vehicle passing through the curve based on the bending grade, a speed reduction control device for executing a speed reduction control for reducing the vehicle speed based on the vehicle speed and the relative position so that the vehicle passes through the curve at the appropriate vehicle speed, and a gradient obtaining device for obtain a gradient of the road on the curve existing in a traveling direction of the vehicle, wherein the determination device determines the appropriate vehicle speed based on the gradient of the road in addition to the bending grade.

6 Claims, 13 Drawing Sheets

U.S. PATENT DOCUMENTS

| | | |
|---|---|---|
| 2001/0008989 A1 | 7/2001 | Minowa et al. |
| 2003/0074123 A1* | 4/2003 | Kin et al. ............... 701/70 |
| 2003/0130780 A1* | 7/2003 | Shiimado et al. ........ 701/65 |
| 2005/0004743 A1 | 1/2005 | Kojima et al. |
| 2005/0012389 A1* | 1/2005 | Kato et al. ............... 303/146 |
| 2005/0125134 A1 | 6/2005 | Iwatsuki et al. |
| 2007/0225882 A1* | 9/2007 | Yamaguchi et al. ...... 701/36 |

FOREIGN PATENT DOCUMENTS

| | | |
|---|---|---|
| DE | 102 58 167 A1 | 7/2003 |
| DE | 10 2004 040 351 A1 | 3/2006 |
| EP | 0 901 929 A1 | 3/1999 |
| EP | 0 928 714 A2 | 7/1999 |
| JP | 2000-321081 A | 11/2000 |
| JP | 2001-206098 A | 7/2001 |
| JP | 2004-230946 A | 8/2004 |
| JP | 2006-137263 A | 6/2006 |

OTHER PUBLICATIONS

Japanese Office Action dated May 15, 2012 issued in the corresponding Japanese Patent Application No. 2008-021627 and English-language translation.

Japanese Notice of Reasons for Rejection dated Oct. 2, 2012 issued in the corresponding Japanese Patent Application No. 2008-021627 and English-language translation.

Chinese Office Action dated Sep. 25, 2012 issued in the corresponding Chinese Patent Application No. 2009100087080 and English-language translation.

\* cited by examiner

MOTION CONTROL DEVICE FOR VEHICLE

CROSS REFERENCE TO RELATED APPLICATIONS

This application is based on and claims priority under 35 U.S.C. §119 to Japanese Patent Application 2008-021627, filed on Jan. 31, 2008, the entire contents of which is incorporated herein by reference.

FIELD OF THE INVENTION

The present invention relates to a motion control device for a vehicle. More specifically, the present invention pertains to a motion control device for a vehicle for executing an automatic reduction of a speed of the vehicle (i.e. a speed reduction control) while the vehicle travels through a curve existing ahead of the vehicle on a road on which the vehicle is traveling.

BACKGROUND

Disclosed in JP2004-230946A is an example of a motion control device for a vehicle. In the motion control device for the vehicle disclosed in JP2004-230946A, an allowable value of a lateral acceleration (i.e. allowable lateral acceleration), which acts on the vehicle when the vehicle travels through a curve, is determined on the basis of a speed of the vehicle (i.e. a vehicle speed) and a road surface friction coefficient. An appropriate vehicle speed for the vehicle traveling through the curve is determined on the basis of the calculated allowable lateral acceleration and a radius of curvature of the curve. Then, the motion control device for the vehicle disclosed in JP2004-230946A executes a speed reduction control for reducing the vehicle speed on the basis of the vehicle speed and a position of the vehicle relative to the curve, so that the vehicle travels through the curve at the appropriate vehicle speed.

In a case where the road has an increasing gradient on the curve, the vehicle speed is expected to be reduced due to an action of gravity. Hence, a sense of security a driver feels (which is hereunder referred also to as a sense of security of a driver) may be high when the vehicle advances to the curve. On the other hand, in a case where the road has a decreasing gradient on the curve, the vehicle speed is expected to be increased due to the action of gravity. Hence, the driver may feel less secure (i.e. the sense of security of the driver is low).

Further, in a case where visibility of the curve is poor because relief of the curve is great, because an elevation of an inner side of the curve is higher than the elevation of the curve, or because of an existence of a tall building at the inner side of the curve, the sense of the security of the driver may be low. Furthermore, the level of the sense of security felt by the driver may fluctuate depending on the driving conditions even if the vehicle travels through the curve while receiving a predetermined same level of lateral acceleration. For example, the sense of security of the driver may be high in a case where the vehicle travels the curve having a small curvature radius of the curve at a low speed. On the other hand, the driver may feel less secure when the vehicle travels the curve having a great curvature radius of the curve at a high speed even if the vehicle travels through the curve while receiving the predetermined same level of the lateral acceleration. Accordingly, the sense of security of the driver fluctuates depending on the gradient of the road on the curve, visibility beyond the curve, a bending grade of the curve (the vehicle speed when traveling through the curve) and the like.

It is considered to be preferable that the appropriate vehicle speed (or, the allowable lateral acceleration), which is set in the above-mentioned speed reduction control, is determined in view of the sense of security of the driver. In other words, the appropriate vehicle speed (or, the allowable lateral speed) may be preferably set in a manner where the greater the sense of security of the driver is, the greater value the appropriate vehicle speed (or, the allowable lateral acceleration) is set to be. On the other hand, in the motion control device disclosed in JP2004-230946A, the appropriate vehicle speed (or, the allowable lateral acceleration) is determined without consideration for the sense of security of the driver.

A need thus exists to provide a motion control device for a vehicle which is not susceptible to the drawback mentioned above. More specifically, the purpose of the present invention is to provide the motion control device (a speed reduction control device) for the vehicle for executing a speed reduction control in view of a sense of security a driver feels when the vehicle advances to a curve.

SUMMARY OF THE INVENTION

According to an aspect of the present invention, a motion control device for a vehicle includes a vehicle speed obtaining device for obtaining a speed of the vehicle, a curvature obtaining device for obtaining a bending grade of a curve existing ahead of the vehicle on a road on which the vehicle travels, a position obtaining device for obtaining a relative position of the vehicle relative to the curve, a determination device for determining an appropriate vehicle speed for the vehicle passing through the curve on the basis of the bending grade of the curve, a speed reduction control device for executing a speed reduction control for reducing the speed of the vehicle on the basis of the speed of the vehicle and the relative position so that the vehicle passes through the curve at the appropriate vehicle speed, and a gradient obtaining device for obtaining a gradient of the road on the curve on the road in a traveling direction of the vehicle, wherein the determination device determines the appropriate vehicle speed on the basis of the gradient of the road in addition to the bending grade of the curve.

According to another aspect of the present invention, a motion control device for a vehicle includes a vehicle speed obtaining device for obtaining a speed of the vehicle, a curvature obtaining device for obtaining a bending grade of a curve existing ahead of the vehicle on a road on which the vehicle travels, a position obtaining device for obtaining a relative position of the vehicle relative to the curve, a determination device for determining an appropriate vehicle speed for the vehicle passing through the curve on the basis of the bending grade of the curve, a speed reduction control device for executing a speed reduction control for reducing the speed of the vehicle on the basis of the speed of the vehicle and the relative position so that the vehicle passes through the curve at the appropriate vehicle speed, and an index obtaining device for obtaining an index that indicates a degree of poor visibility of the curve to the driver, wherein the determination device determines the appropriate vehicle speed on the basis of the index in addition to the bending grade of the curve.

According to a further aspect of the present invention, a motion control device for a vehicle includes a vehicle speed obtaining device for obtaining a speed of the vehicle, a curvature obtaining device for obtaining a bending grade of a curve existing ahead of the vehicle on a road on which the vehicle travels, a position obtaining device for obtaining a relative position of the vehicle relative to the curve, a calculation device for calculating an allowable lateral acceleration, which is an allowable value of a lateral acceleration acting on the vehicle when passing through the curve, a determination device for determining an appropriate vehicle speed for the vehicle passing through the curve on the basis of the bending grade of the curve and the allowable lateral acceleration, and a speed reduction control device for executing a speed reduction control for reducing the speed of the vehicle on the basis of the speed of the vehicle and the relative position so that the vehicle passes though the curve at the appropriate vehicle speed, wherein the calculation device calculates the allowable lateral acceleration on the basis of the bending grade of the curve.

According to a further aspect of the present invention, a motion control device for a vehicle includes a vehicle speed obtaining device for obtaining a speed of the vehicle, a curvature obtaining device for obtaining a bending grade of a curve existing ahead of the vehicle on a road on which the vehicle travels, a position obtaining device for obtaining a relative position of the vehicle relative to the curve, a calculation device for calculating an allowable lateral acceleration, which is an allowable value of a lateral acceleration acting on the vehicle when passing through the curve, a determination device for determining an appropriate vehicle speed for the vehicle passing through the curve on the basis of the bending grade of the curve and the allowable lateral acceleration, a speed reduction control device for executing a speed reduction control for reducing the speed of the vehicle on the basis of the speed of the vehicle and the relative position so that the vehicle passes through the curve at the appropriate vehicle speed, and a gradient obtaining device for obtaining a gradient of the curve on the road in a traveling direction of the vehicle, wherein the calculation device calculates the allowable lateral acceleration on the basis of the gradient of the road.

According to a further aspect of the present invention, a motion control device for a vehicle includes a vehicle speed obtaining device for obtaining a speed of the vehicle, a curvature obtaining device for obtaining a bending grade of a curve existing ahead of the vehicle on a road on which the vehicle travels, a position obtaining device for obtaining a relative position of the vehicle relative to the curve, a calculation device for calculating an allowable lateral acceleration, which is an allowable value of a lateral acceleration acting on the vehicle when passing through the curve, a determination device for determining an appropriate vehicle speed for the vehicle passing through the curve on the basis of the bending grade of the curve and the allowable lateral acceleration, a speed reduction control device for executing a speed reduction control for reducing the speed of the vehicle on the basis of the speed of the vehicle and the relative position so that the vehicle passes through the curve at the appropriate vehicle speed, and an index obtaining device for obtaining an index that indicates a degree of poor visibility of the curve to the driver, wherein the calculation device calculates the allowable lateral acceleration on the basis of the index.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

An embodiment of a motion control device (a speed reduction control device) for a vehicle will be described below in accordance with the attached drawings.

[Configuration]

Figure 1:
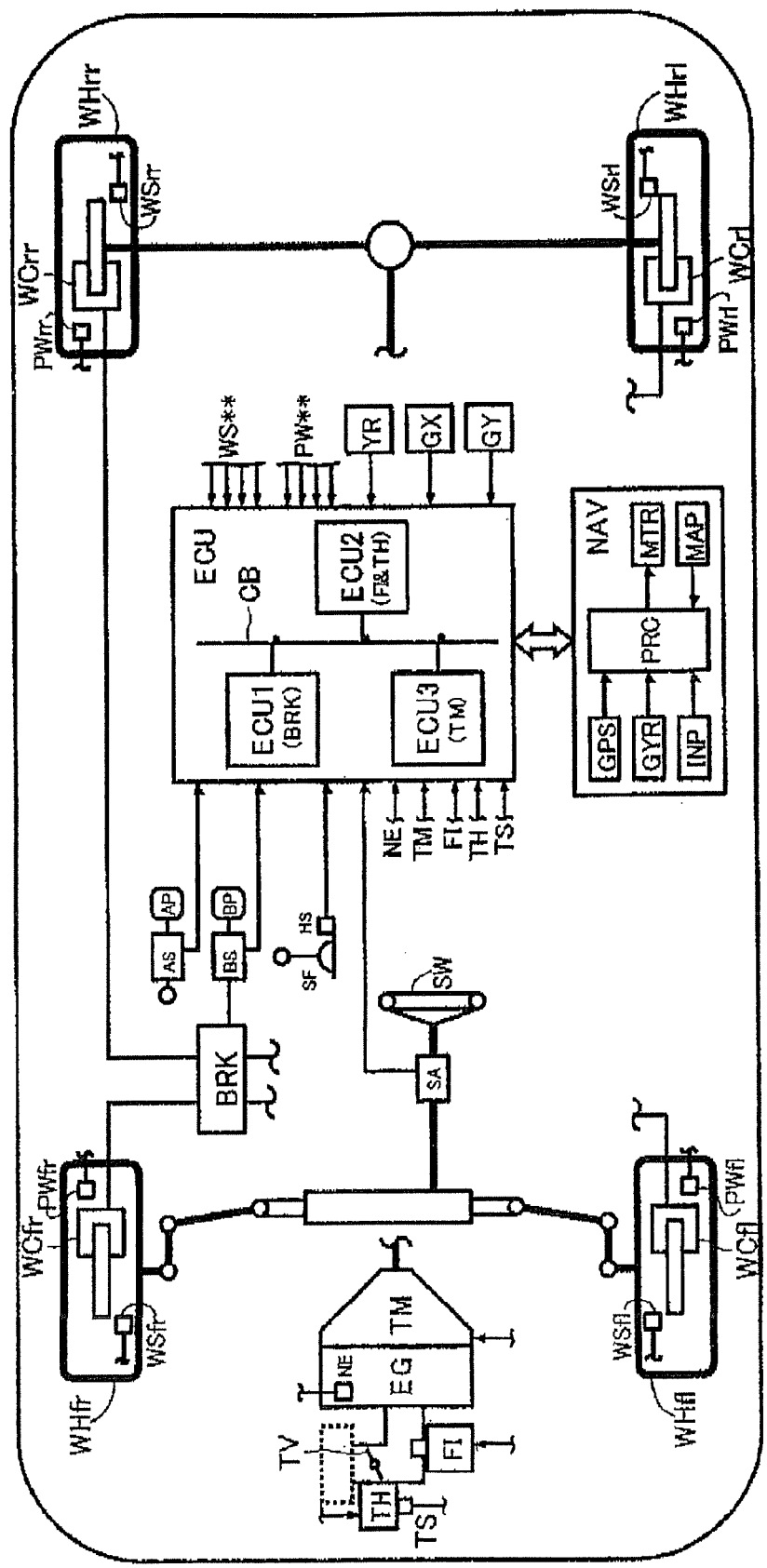
FIG. 1 is a diagram schematically illustrating a structure of a vehicle on which a motion control device for a vehicle according to an embodiment is mounted.

FIG. 1 schematically illustrates a structure of the vehicle to which the motion control device (which is hereinafter referred to as a devise) is provided. The device includes an engine EG, which serves as a power source, an automatic transmission TM, a brake actuator BRK, an electronic control unit ECU and a navigation device NAV.

For example, an internal combustion engine is used as the engine EG. More specifically, an opening degree of a throttle valve TV is adjusted by a throttle actuator TH in response to an operation of an acceleration pedal (acceleration operation member) AP by a driver. An amount of fuel proportional to an inhaled air volume, which is adjusted in response to the opening degree of the throttle valve TV, is injected by a fuel injection actuator FI (an injector). As a result the engine EG generates an output torque in response to the operation of the acceleration pedal AP by the driver.

A multi-stage automatic transmission having plural shift stages or a continuously variable automatic transmission having no shift stages may be used as the automatic transmission TM. The automatic transmission TM is configured so as to automatically (without being influenced by an operation of a gear lever SF by the driver) change a reduction gear ratio (a rotational speed of an output shaft of the engine EG (i.e. rotational speed of an input shaft of the transmission TM) divided by a rotational speed of an output shaft of the transmission TM) in response to an operation condition of the engine EG and a position of the gear lever SF, which serves as a shift operation member.

The brake actuator BRK has a known configuration in which plural electromagnetic valves, a hydraulic pump, a motor and the like are included. The brake actuator BRK supplies a brake pressure (brake, hydraulic pressure) in response to an operation of a brake pedal BP, which serves as a brake operation member, by the driver to a wheel cylinder WC of each wheel WH when a brake control is not executed. Further, the brake actuator BRK is configured to individually adjust the brake pressure within the wheel cylinder WC of each wheel WH independently from the operation of the brake pedal BP (and the operation of the acceleration pedal AP) when the brake control is executed.

Symbols '' are used to comprehensively indicate wheels, specifically, 'fl' indicates a front-left wheel, 'fr' indicate a front-right wheel, 'rl' indicates a rear-left wheel, and 'rr' indicates a rear-right wheel. Hence, for example, the wheel cylinder WC comprehensively indicates a front-left wheel cylinder WCfl, a front-right wheel cylinder WCfr, a rear-left wheel cylinder WCrl, and a rear-right wheel cylinder WCrr.

The device includes a wheel speed sensor WS for detecting a wheel speed of the wheel WH, a brake pressure sensor PW for detecting the brake pressure within the wheel cylinder WC, a steering wheel angle sensor SA for detecting a rotational angle (from a neutral position) of a steering wheel SW, a yaw rate sensor YR for detecting a yaw rate of a vehicle body, a longitudinal acceleration sensor GX for detecting an acceleration (a deceleration) generated in a front-rear direction (a longitudinal direction) of the vehicle body, a lateral acceleration sensor GY for detecting an acceleration generated in a lateral direction of the vehicle body, an engine rotational speed sensor NE for detecting a rotational speed of the output shaft of the engine EG, an acceleration operation sensor AS for detecting an operation variable of the acceleration pedal AP, a brake operation sensor BS for detecting an operation variable of the brake pedal BP, a shift position sensor HS for detecting the position of the gear lever SF, and a throttle valve opening degree sensor TS for detecting the opening degree of the throttle valve TV.

The electronic control unit ECU is a microcomputer that electronically controls a power train system and a chassis system of the vehicle. The electronic control unit ECU is electrically connected to above-described each actuator, above-described each sensor and the automatic transmission TM. Alternatively, the electronic control unit ECU is configured so as to communicate with above-described each actuator, above-described each sensor and the automatic transmission TM via a network. The electronic control unit ECU is configured with plural control units (ECU 1, ECU 2 and ECU 3), which are connected to one another via a communication bus CB.

The ECU 1 (a wheel brake control means) included in the electronic control unit ECU is a wheel brake control unit. The ECU 1 is configured so as to execute a brake pressure control (wheel brake control) such as a known anti-skid control (ABS control), a traction control (TCS control), a vehicle stability control (ESC control) and the like by controlling the brake actuator BRK on the basis of signals outputted from the wheel speed sensor WS**, the longitudinal acceleration sensor GX, the lateral acceleration sensor GY, the yaw rate sensor RY and the like.

The ECU 2 (an engine output reduction means) included in the electronic control unit ECU is an engine control unit. The ECU 2 is configured so as to execute all output torque control (an engine control) of the engine EG by controlling the throttle actuator TH and the fuel injection actuator FI on the basis of a signal outputted from the acceleration operation sensor AS and the like.

The ECU 3 (a transmission control means) included in the electronic control unit ECU is an automatic transmission control unit. The ECU 3 is configured so as to executed a reduction gear ratio control (a transmission control) by controlling the automatic transmission TM on the basis of a signal outputted from the shift position sensor HS and the like.

A navigation device NAV includes a navigation processor PRC. The navigation processor PRC is electrically connected to a vehicle position detection means (global positioning system) GPS, a yaw rate gyro GYR, an input portion INP, a storage portion MAP and a display portion (display) MTR. The navigation device NAV is electrically connected to the electronic control unit ECU. Alternatively, the navigation device NAV is configured so as to communicate with the electronic control unit ECU via radio waves.

The vehicle position detection means GPS is configured so as to detect a position (latitude, longitude and the like) of the vehicle by using one of known methods utilizing a positioning signal from a satellite. The yaw rate gyro GYR is configured to detect an angular velocity (the yaw rate) of the vehicle body. The input portion INP is configured so as to input therein an operation relating to a navigation function performed by the driver. The storage portion MAP memorizes therein various information, such as map information, road information and the like.

The navigation processor PRC is configured so as to comprehensively process signals from the vehicle position detection means GPS, the yaw rate gyro GYR, the input portion INP and the storage portion MAP and so as to display the processed results (information relating to the navigation function) on the display portion MTR.

[Curve Travel Assistance Control]

A curve travel assistance control executed by the device, more specifically by the electronic control unit ECU, which has the above-described configuration, will be described below. The curve travel assistance control is configured with a speed reduction control and an acceleration limit control. The speed reduction control is a control for reducing the vehicle speed (i.e. for decelerating the vehicle) without being influenced by an acceleration operation or a deceleration operation (the operation of the acceleration pedal AP or the operation of the brake pedal BP) by the driver, so that the vehicle appropriately travels through a curve in a case where the vehicle is about to advance to (approaching) the curve at a speed higher than a speed by which the vehicle appropriately travels through the curve.

The acceleration limit control is continuously executed after the speed reduction control. The acceleration limit control is a control for gradually canceling an acceleration limit after maintaining the vehicle speed for a predetermined period of time. The reduction of the vehicle speed is achieved by using at least one of reduction of the output of the engine EG, downshift of the transmission TM and a wheel brake. The acceleration limit is achieved by the reduction of the output of the engine EG.

In the speed reduction control, a point, at which the speed reduction is started, is determined on the basis of a speed of the vehicle (vehicle speed) Vx, a shape of the curve existing immediately ahead of the vehicle, and a relative position between the curve and the vehicle (i.e. a position of the vehicle relative to the curve, a distance between the curve and the vehicle). The reduction of the vehicle speed is started when the vehicle reaches the point determined. Then, the reduction of the vehicle speed is ended when the vehicle speed Vx becomes appropriate.

Figure 2:
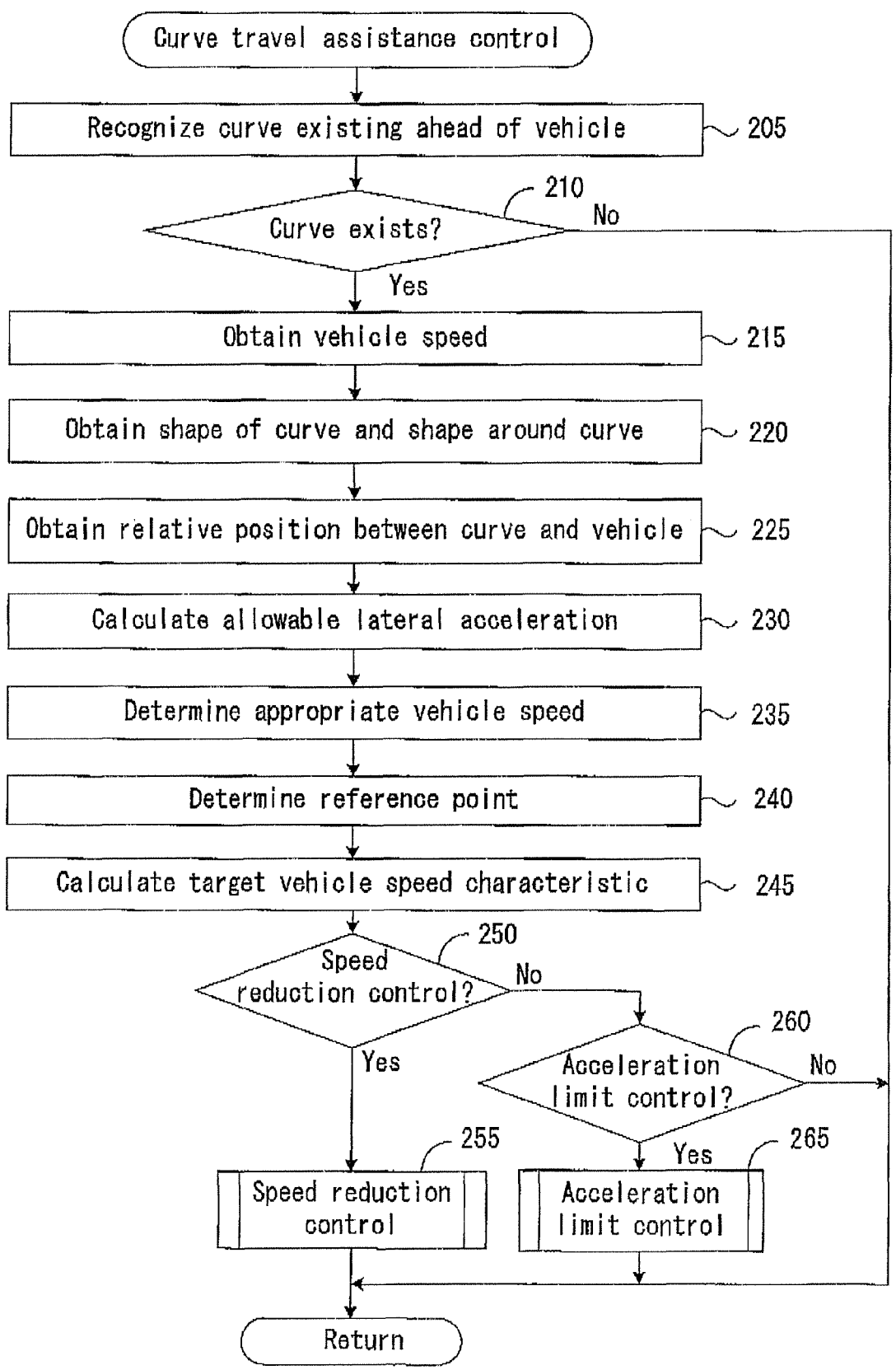
FIG. 2 is a flowchart illustrating a routine for executing a curve travel assistance control, which is executed by an electronic control unit of the motion control device.
Figure 3:
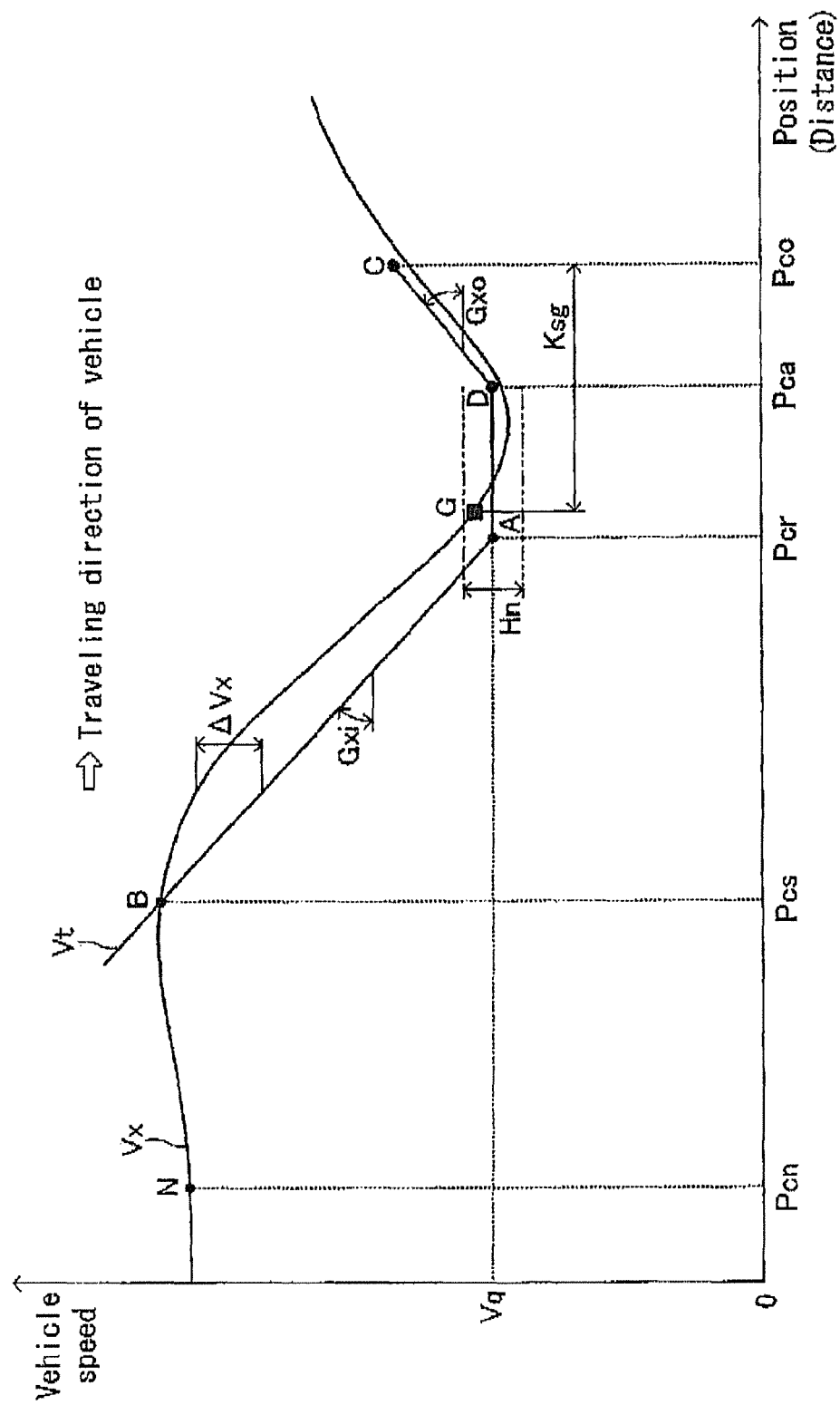
FIG. 3 is a graph illustrating an example of a relationship between a position of the vehicle on a road and a vehicle speed.

The curve travel assistance control is described in more detail below with reference to a routine illustrated by a flowchart of FIG. 2 and a diagram of FIG. 3 illustrating a relationship between the position of the vehicle on the road and the vehicle speed. The routine illustrated in FIG. 2 is executed at, for example, every predetermined operation period.

Figure 4:
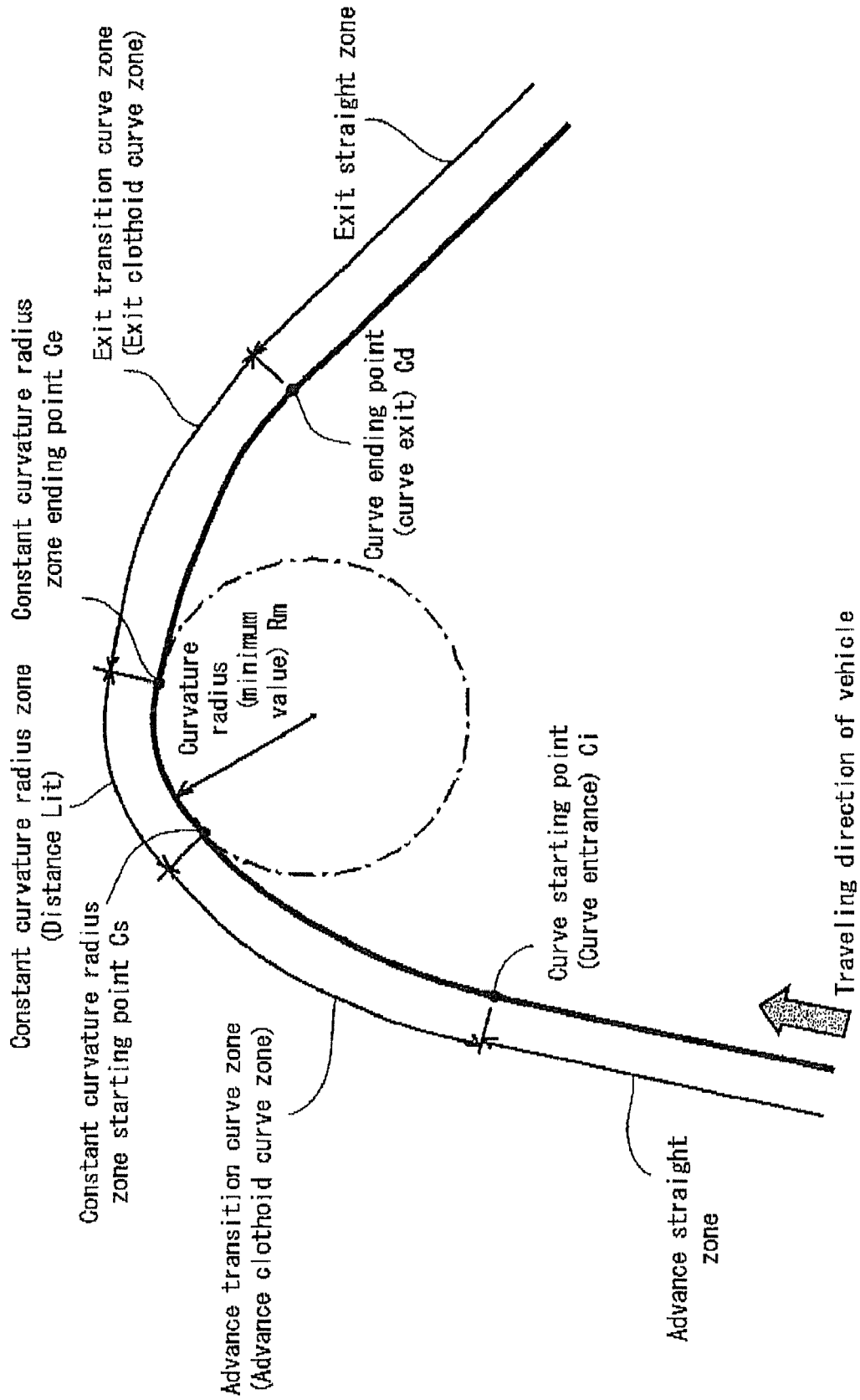
FIG. 4 is a diagram illustrating an example of a shape of a curve.

As illustrated in FIG. 4, generally on a road, a curve is structured with an advance transition curve zone (a transition curve zone on a curve entrance side), a constant curvature radius zone and an exit transition curve zone (a transition curve zone on a curve exit side) in this order towards a curve ending point (curve exit) from a curve starting point (curve entrance). The transition curve is, for example, structured by a clothoid curve. The transition curve is provided so that the vehicle smoothly travels through the curve while the driver gradually steers the steering wheel SW and then returns the steering wheel SW without a sudden operation of the steering wheel SW The curve travel assistance control is described below in a case where the vehicle travels the curve illustrated in FIG. 4 as an example. In this embodiment, a point closer to the vehicle relative to a predetermined point may be referred to as 'a front side'. A point farther from the vehicle relative to the predetermined point may be referred to as 'a back side'. Further, a term 'passing of the curve starting point' may be expressed as 'advancing to the curve'. A term 'passing of the curve ending point' may be expressed as 'exiting from the curve'.

Firstly, in step 205, a process for recognizing a curve existing ahead of the vehicle (i.e. a curve recognition process) is executed. The curve recognition process is executed by at least one of the navigation device NAV and an image recognition device. For example, the existence of the curve is recognized once the vehicle reaches a range a predetermined distance away from the curve (i.e. once the distance between the vehicle and the curve becomes equal to or less than a predetermined value (a predetermined distance).

In step 210, the electronic control unit ECU determines whether or not the curve exists. In a case where the existence of the curve is not recognized, the routine illustrated in FIG. 2 is ended. On the other hand, in a case where the existence of the curve is recognized (see a point Pcn (a point N) in FIG. 3), the processes following step 215 are executed.

In step 215, the current vehicle speed Vx is obtained (the vehicle speed obtaining means). In step 220, the shape of the curve existing immediately ahead of the vehicle and a shape around the curve are obtained (the curvature obtaining means). In step 225, the relative position between the vehicle and the curve, whose shape is obtained in step 220, is obtained (the position obtaining means). This information (i.e. the current vehicle speed Vx, the shape of the curve, the shape around the curve, and the relative position between the vehicle and the curve) may be obtained via the network within the vehicle.

The shape of the curve includes information relating to a curvature radius Rc of the curve, an increasing/decreasing gradient of the road on the curve, an elevation (undulation) on the curve and the like. For example, an area around the curve includes an inner area relative to the curve, an outer area relative to the curve and the like. The shape around the curve includes information relating to an elevation and the like around the curve, specifically the inner area of the curve. This information is included in the map information that is stored in the storage portion MAP.

Positions such as the curve starting point, the curve ending point and the like, and the curvature radius of each position are preliminarily memorized in the map information. Further, positions of plural predetermined points on the road (node points) and a curvature radius of each point are memorized in the map information. As illustrated it FIG. 5, the curvature radius Rc of the curve may be estimated on the basis of an approximated curve formed by geometrically and smoothly connecting the aforementioned plural points. The detailed explanation of estimation of the curvature radius Rc of the curve based on the approximated curve is disclosed in JP3378490B.

A relative position Pc between the curve and the vehicle is obtained by using the vehicle position detection means GPS of the navigation device NAV and the map information. More specifically, the current vehicle position (the latitude, longitude and the like) on the coordinates fixed on the earth (the terrestrial coordinates) is detected by the vehicle position detection means GPS and the detected current vehicle position is set as an initial position of the vehicle. Then, after the initial position of the vehicle is determined by the vehicle position detection means GPS, a relative position of the vehicle from the initial position is sequentially updated on the basis of information obtained from the yaw rate gyro GYR, the longitudinal acceleration sensors GX, the lateral acceleration sensor GY, the wheel speed sensor WS** and the like. Accordingly, the current vehicle position is estimated. The map information includes a position of each road (latitude and longitude). Hence, by referring to the current vehicle position and the position of the road, the relative position Pc between the curve and the vehicle is obtained.

Further, the relative position Pc between the curve and the vehicle, and the shape of the curve (the curvature radius Rc of the curve) may be obtained by using an image processing of a charge-coupled device (CCD) camera mounted on the vehicle. More specifically, a white line on the road or an edge portion of the road is detected on the basis of an image captured by a stereo camera mounted on the vehicle. Then, a distance distribution on the entire image is calculated on the basis of an offset amount of the corresponding positions in the stereo image and a principle of triangulation. Accordingly, the distance from the vehicle to the curve (i.e. a relative distance Pc between the curve and the vehicle) and the curvature radius Rc of the curve are obtained on the basis of the calculation results. The above-described method of obtaining the relative position between the vehicle and the curve, and the shape of the curve are disclosed in more detail in JP3378490B.

In step 230, an allowable lateral acceleration Gyo or Gyp (an allowable value of the lateral acceleration acting on the vehicle when the vehicle travels through the curve) is calculated (the determination means, the calculation means). The allowable lateral acceleration is obtained by modifying a pre-set allowable lateral acceleration reference value Gya (constant) as described below. The detailed calculation will be described below.

Figure 6:
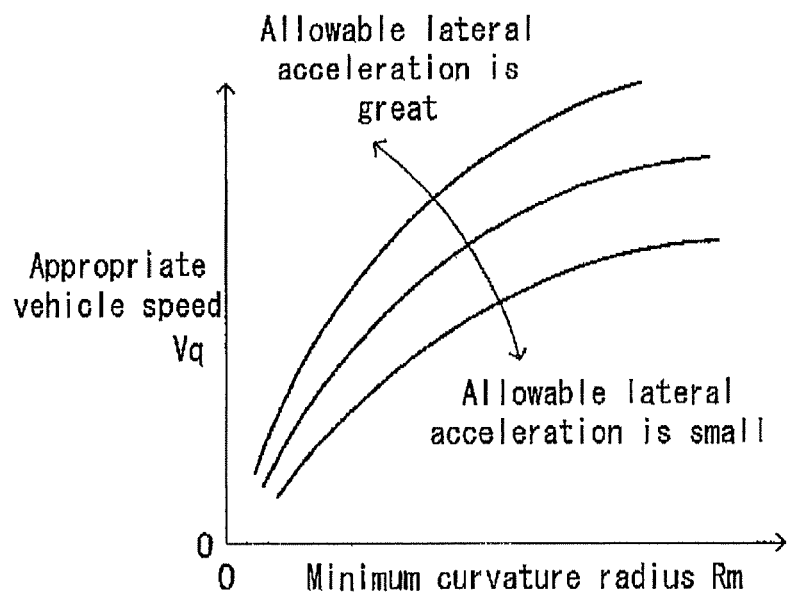
FIG. 6 is a graph illustrating a relationship between a minimum curvature radius, an allowable lateral acceleration and an appropriate vehicle speed.

In step 235, an appropriate vehicle speed Vq (see FIG. 3) is determined on the basis of the curvature radius Rc of the curve (a minimum curvature radius Rm) and the allowable lateral acceleration (the determination means). More specifically, the appropriate vehicle speed Vq is determined on the basis of, for example, the following equations (equation 1 and equation 2). In this case, the appropriate vehicle speed Vq is set as illustrated in FIG. 6.

$$Vq = \sqrt{(Gyo \cdot Rm)} \quad \text{Equation 1:}$$

$$Vq = \sqrt{(Gyp \cdot Rm)} \quad \text{Equation 2:}$$

In step 240, the reference point Pcr is determined. The reference point Pcr is a target point for achieving the appropriate vehicle speed Vq. For example, a staring point of a constant curvature radius zone on the curve, i.e., a point nearest to the vehicle within the zone in which the curvature radius remains constant, is specified to be the reference point Pcr. The reference point Pcr corresponds to a constant curvature radius zone starting point Cs (i.e. an ending point of an advance transition curve zone) in FIG. 4. Further, a point at which the curvature radius Rc becomes minimum on the curve may be set as the reference point Pcr.

Figure 5:
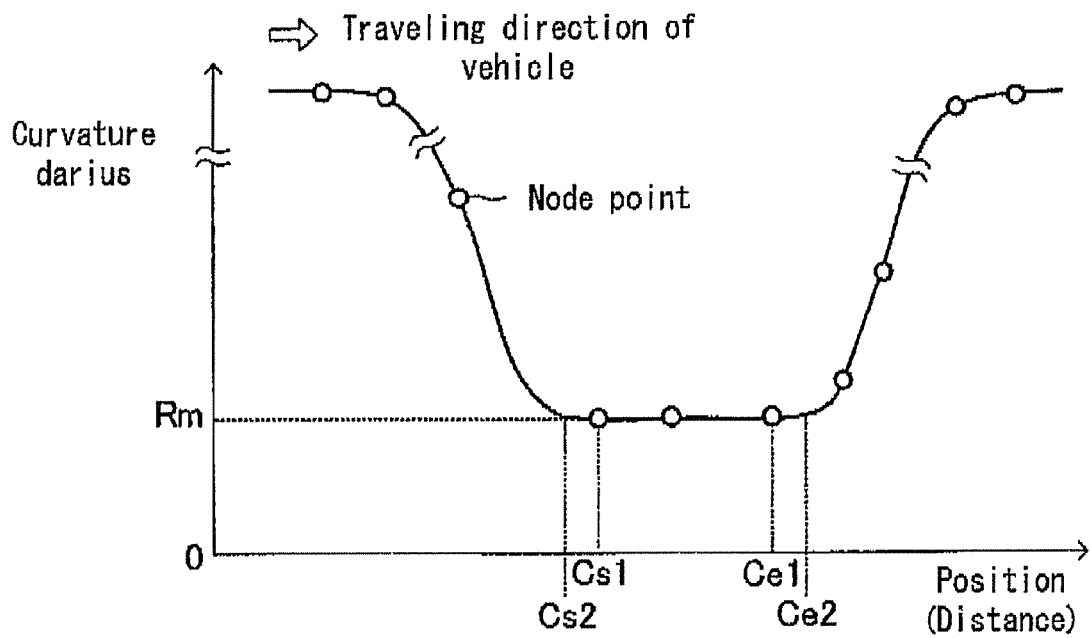
FIG. 5 is a graph illustrating a relationship between the position on the road and a curvature radius of the curve.

Additionally, a point Cs1 in FIG. 5 (i.e. a point corresponding to a node point existing at the front-most side within the constant curvature radius zone that is obtained on the basis of the approximated curve formed by geometrically and smoothly connecting the plural node points) may be specified as the constant curvature radius zone starting point Cs. Alternatively, a point Cs2 in FIG. 5 (i.e. a starting point (a peripheral node at the front side) of the constant curvature radius zone obtained from the approximated curve) may be specified to be the constant curvature radius zone starting point Cs.

The reference point Pcr may be set at a point existing a predetermined distance closer to the vehicle relative to the constant curvature radius zone starting point Cs (i.e. the ending point of the advance transition curve zone) on the curve in view of a possible delay of speed reduction while the speed reduction control is executed (e.g. a delay of downshift of the automatic transmission TM). As a result, the vehicle speed may be reduced down to the appropriate vehicle speed Vq before the vehicle reaches the point Cs in view of a possibility of an error included in the positioning information and the like.

In step 245, as illustrated by a line A-B in FIG. 3, a target vehicle speed characteristic Vt in a case where the vehicle speed is reduced according to a pre-set deceleration characteristic (e.g. a deceleration Gxi) is calculated on the basis of the appropriate vehicle speed Vq at the reference point Pcr as a reference. The deceleration characteristic may be set as a pre-set constant value. Alternatively, the deceleration characteristic may be adjusted on the basis of at least one of the acceleration/deceleration operation by the driver, the curvature radius Rc of the curve, the appropriate vehicle speed Vq, the increasing/decreasing gradient of the curve and a road surface friction coefficient.

As illustrated in FIG. 3, the target vehicle speed characteristic Vt is a target of a reduction characteristic of the vehicle speed relative to the vehicle position on the road (on the advance transition curve zone). Further, the target vehicle speed characteristic Vt has a property in which the vehicle speed becomes the appropriate vehicle speed Vq at the reference point Pcr and in which the target vehicle speed characteristic Vt is increased as being away from the reference point Pcr towards the vehicle. Additionally, illustrated in FIG. 3 is a case where the deceleration characteristic is constant. In this case, more properly, the line A-B forms an upwardly convex curve. However, the A-B line is expressed as a straight line in order to facilitate understanding.

Figure 7:
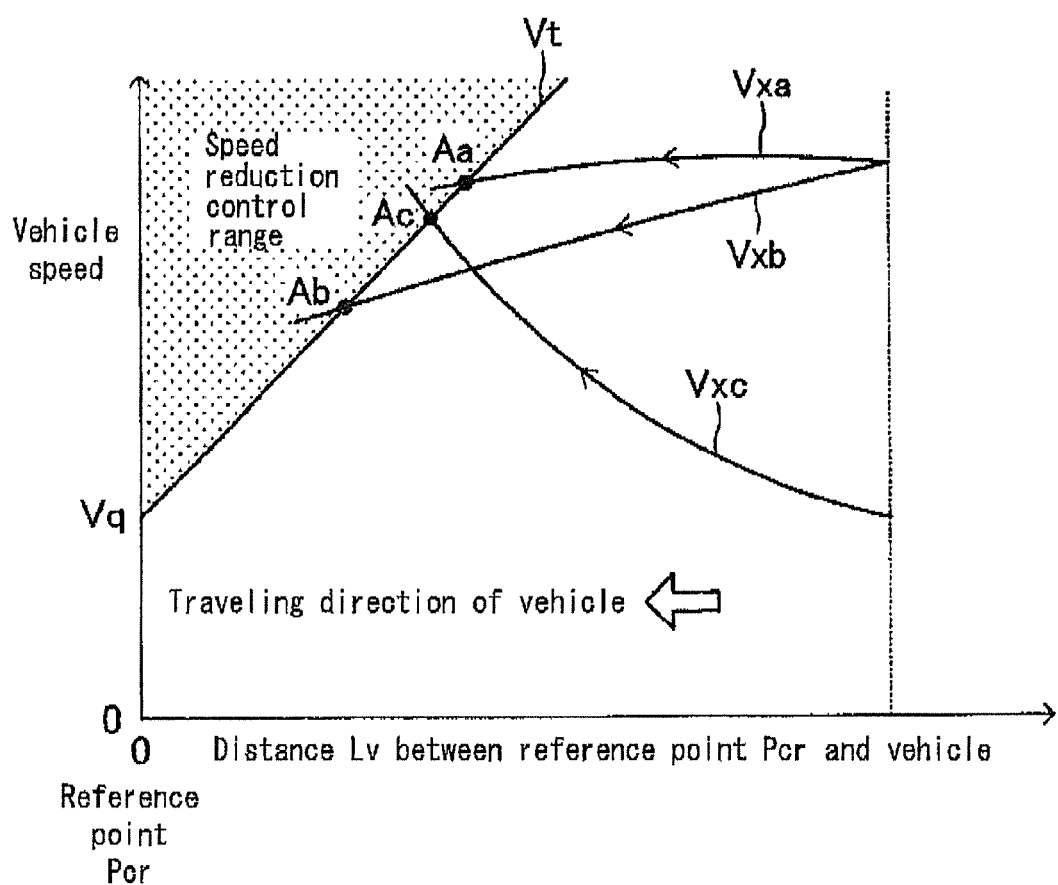
FIG. 7 is a diagram for explaining a starting condition of a speed reduction control.

In step 250, it is determined whether or not a starting condition for the speed reduction control (which is hereinafter referred to as a speed reduction control starting condition) is satisfied (start determination). As illustrated in FIG. 7, the start determination is performed on the basis of the relative distance Pc between the curve and the vehicle. More specifically, the start determination is executed on the basis of a distance Lv between the reference point Pcr and the vehicle, and the vehicle speed Vx. The distance Lv being zero (Lv=0) indicates the reference point Pcr. A range provided at an upper left side of the target vehicle speed characteristic Vt shown by fine dots indicates a speed reduction control range where the curve speed reduction control is performed.

While the vehicle is approaching the curve, the distance Lv is decreasing and the vehicle speed Vx is changing in response to an operating status of the driver. Accordingly, a point (Lv, Vx) moves on a coordinate plane of FIG. 7. In a case where the point (Lv, Vx) passes over the target vehicle speed characteristic Vt, the speed reduction control starting condition is satisfied and the speed reduction control is started. The speed reduction control is executed without being influenced by the acceleration/deceleration operation by the driver before the control is started.

The speed reduction control is started when the point (Lv, Vx) pass over the target vehicle speed characteristic Vt in any case where the vehicle travels at substantially constant speed (vehicle speed Vxa), where the vehicle decelerates by the driver operating the brake pedal BP (vehicle speed Vxb), and where the vehicle accelerates by the driver operating the acceleration pedal AP (vehicle speed Vxc) in FIG. 7 (see points Aa, Ab and Ac). In FIG. 3, the speed reduction control is started at a point Pcs (point B) at which the line indicating the target vehicle speed characteristic Vt intersects with the line indicating changes of the vehicle speed Vx.

Accordingly, the speed reduction control is started (the speed reduction control starting condition is satisfied) in the case where the current vehicle speed exceeds the vehicle speed at 'the current vehicle position Lv relative to the reference point' with reference to the target vehicle speed characteristic Vt.

Figure 8:
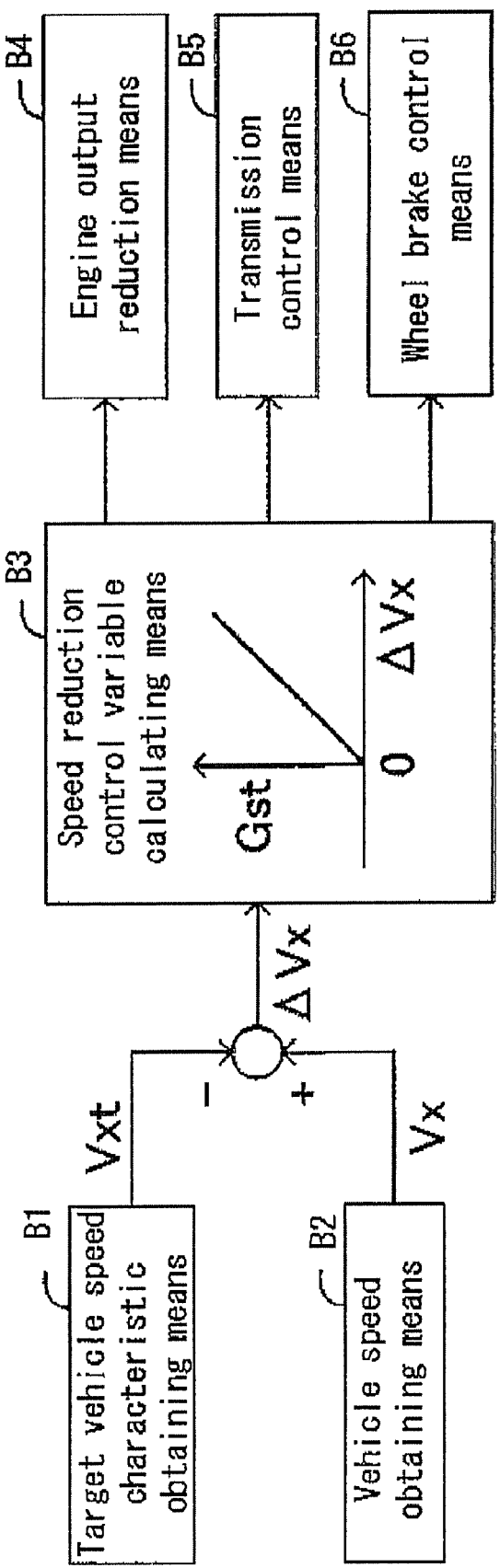
FIG. 8 is a functional block diagram relating to the speed reduction control.

In the case where the speed reduction control starling condition is satisfied, the speed reduction control is started and executed in step 255 (the speed reduction control means). Illustrated in FIG. 8 is a functional block diagram relating to the speed reduction control. As illustrated in FIG. 8, a target vehicle speed characteristic obtaining means B1 calculates a target vehicle speed Vxt at the current vehicle position on the basis of the target vehicle speed characteristic Vt. A vehicle speed obtaining means B2 obtains the current vehicle speed Vx.

A speed reduction control variable calculating means B3 determines a speed reduction control variable Gst on the basis of a deviation $\Delta Vx$ between the vehicle speed Vx and the target vehicle speed Vxt ($\Delta Vx = Vx - Vxt$, see FIG. 3). The speed reduction control variable Gst is determined to zero (0) in a case where the deviation $\Delta Vx$ is negative. On the other hand, in a case where the deviation $\Delta Vx$ is positive, the greater the deviation $\Delta Vx$ is, the greater value the speed reduction variable Gst is determined to be.

Then, one or more of the reduction of the engine output by the engine output reduction means B4 (at least one of a reduction of the throttle opening degree, a retardation of an ignition timing and a reduction of a fuel injection amount), an increase of the 'reduction gear ratio' (the downshift and the like) by the transmission control means B5, and an application of a brake torque (application of the brake pressure) executed by the wheel brake control means B6 by means of the wheel brake, is executed on the basis of the speed reduction control variable Gst. As a result, the vehicle speed Vx is reduced down to the appropriate vehicle speed Vq so as to follow the target vehicle speed characteristic Vt.

The speed reduction control is ended in a case where the vehicle speed Vx approximately reaches the appropriate vehicle speed Vq. More specifically, for example, as illustrated in FIG. 3, the speed reduction control is ended when the decreasing vehicle speed Vx reaches a point (a point G) which exists within a small range Hn in which the appropriate vehicle speed Vq is included.

After the speed reduction control is ended, it is determined whether or not to start the acceleration limit control at step 260. Then, the acceleration limit control is started and executed in step 265. In other words, while the wheel brake control is completely ended (the brake torque and the brake pressure are set to zero), a state, where the acceleration is limited (a limitation of the throttle opening degree) and where the downshift of the transmission TM is executed, continuously continues through a continuation value Kgs (see FIG. 3). A value in the continuation value Kgs indicates a distance or time.

As the speed reduction control is executed independently of the acceleration/deceleration operation of the driver, the driver may operate the acceleration pedal AP while the speed reduction control is executed. If the acceleration limit is not executed immediately after the end of the speed reduction control in the above-mentioned case, the vehicle may suddenly accelerate (an excessive acceleration slip may occur at a driving wheel). Hence, the acceleration limit control is executed through the predetermined continuation value Ksg.

In the acceleration limit control, as illustrated in FIG. 3, firstly, the acceleration (speed increase) is completely limited (from the point G to a point D, i.e. from a speed reduction control ending point to a point Pca) for a predetermined period of time (i.e. a vehicle speed maintaining period). Then, a degree of limitation on the acceleration is gradually relaxed for a predetermined period of time (an acceleration limit period), so that an allowable acceleration degree (an acceleration Gxo) gradually increases (from the point D to a point C, i.e. from the point Pca to a point Pco). Then, when the acceleration limit period ends, the acceleration limit is cancelled (the point C, the point Pco).

The driver may prefer accelerating the vehicle towards the curve ending point. Hence, the device may be modified so that the downshift at the transmission TM is continued (i.e. maintain the deceleration gear ratio to be constant) for a predetermined value even after the acceleration limitation is cancelled. A value in the predetermined value indicates a distance or time.

Further, the device of the embodiment may be modified so as to immediately end the acceleration limit control when the driver conducts the acceleration operation in the acceleration limit period in order to directly reflect an acceleration intention of the driver. Described above is the curve travel assistance control.

Figure 9:
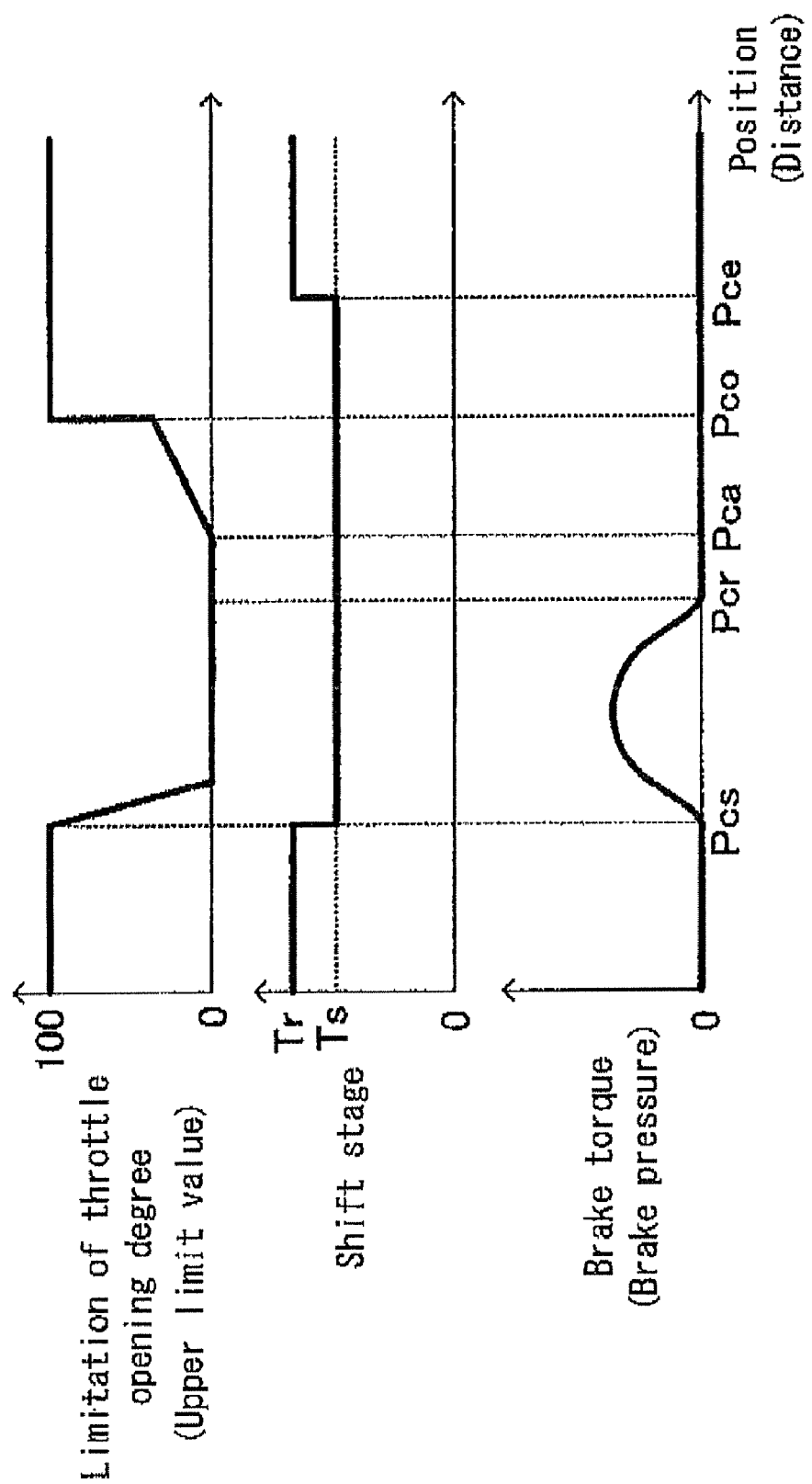
FIG. 9 is a diagram illustrating an example of a case where the curve travel assistance control is executed by the device illustrated in FIG. 1.

Illustrated in FIG. 9 is an example of a case where the curve travel assistance control is executed by the device. When the vehicle passes the point Pcs, at which the speed reduction control starting condition is satisfied, the speed reduction control is activated. Accordingly, the limitation of the throttle opening degree (the throttle opening degree does not become a value that exceeds an upper limit value although the throttle opening degree is limited up to the upper limit value), the increase of the deceleration gear ratio of the transmission TM (the downshift in which a shift stage Tr is changed to a shift stage Ts), and the application of the brake torque (the brake pressure) are started by the wheel brake.

The vehicle is gradually decelerated by the speed reduction control. The speed reduction control is ended at the point where the vehicle speed Vx approximately matches the appropriate vehicle speed Vq (in the vicinity of the reference point Pcr). Accordingly, while the brake torque of the wheel brake becomes zero (0), the above-described acceleration limit control is continuously started. Therefore, a limit is set for the throttle opening degree (the upper limit value=0) until the vehicle passes through the point Pca. Then, the acceleration limitation is gradually relaxed and the acceleration limitation is completely cancelled when the vehicle passes through the point Pco. On the other hand, the downshift status (the shift stage=Ts) is maintained at the transmission TM until the vehicle passes a point Pce in preparation for the acceleration operation by the driver. However, in a case where the driver does not conduct the acceleration operation an upshift in which the shift stage Ts is changed to the shift stage Tr is executed.

[Calculation of Allowable Lateral Acceleration]

Figure 10:
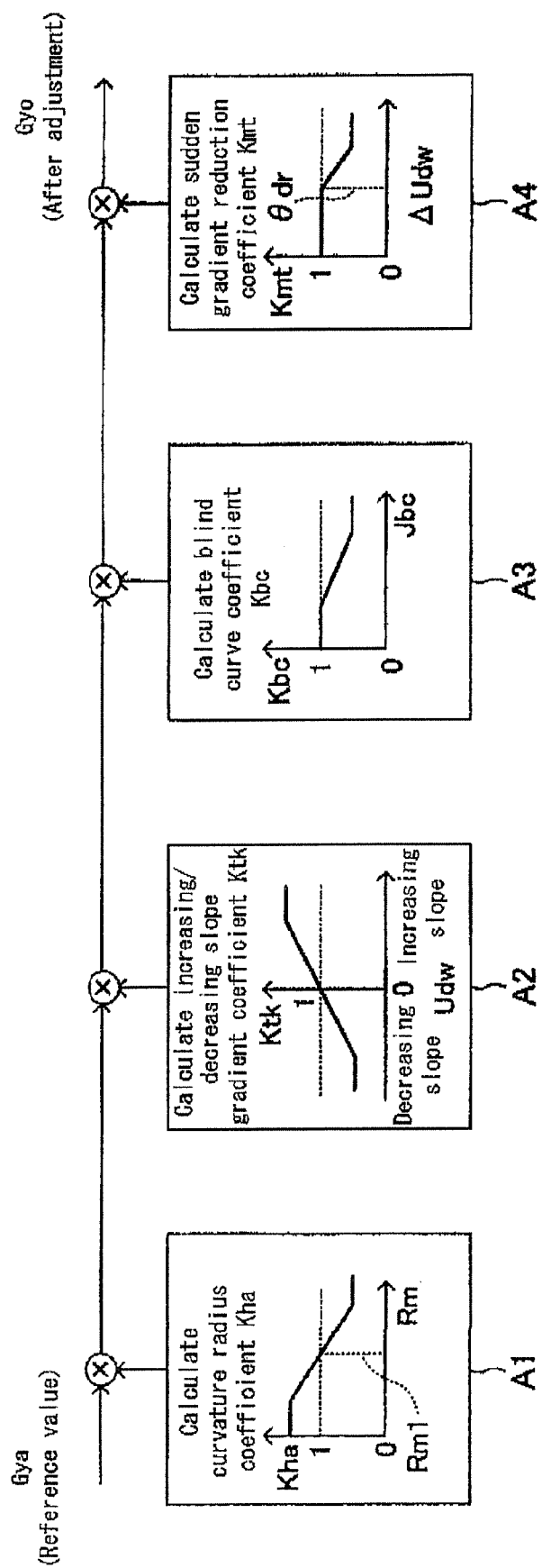
FIG. 10 is a block diagram relating to a calculation of the allowable lateral acceleration in a case where the allowable lateral acceleration is adjusted by multiplying an allowable lateral acceleration reference value by an adjustment coefficient.
Figure 11:
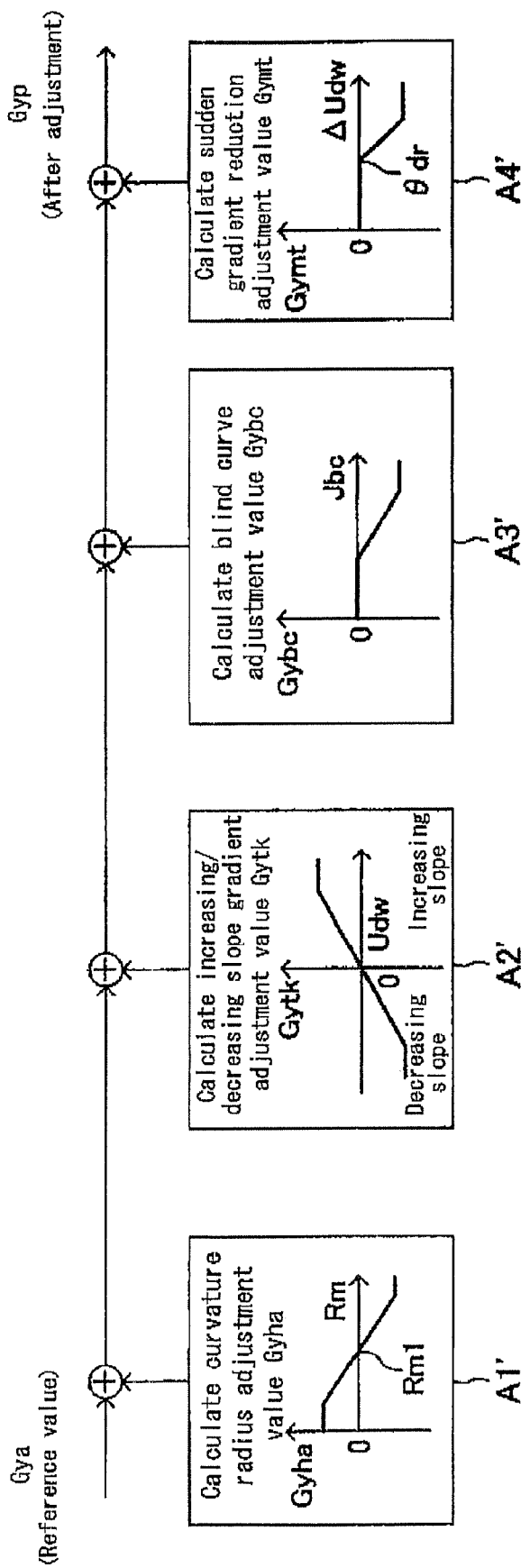
FIG. 11 is a block diagram relating to a calculation of the allowable lateral acceleration in a case where the allowable lateral acceleration is adjusted by adding an adjustment value to the allowable lateral acceleration reference value.

A calculation of the allowable lateral acceleration in step 230 in FIG. 2 will be described more in detail with reference to FIGS. 10 and 11. Illustrated in FIG. 10 is a case where the allowable lateral acceleration Gyo is adjusted by multiplying the allowable lateral acceleration reference value Gya by an adjustment coefficient. In a case where the adjustment of the allowable lateral acceleration Gyo is not executed, the adjustment coefficient is set to one (1). Illustrated in FIG. 11 is a case where the allowable lateral acceleration Gyp is adjusted by adding an adjustment value to the reference value Gya. In a case where the adjustment of the allowable lateral acceleration Gyp is not executed, the adjustment value is set to zero (0). The allowable lateral acceleration is adjusted in perspective of the curvature radius Rc of the curve, an increasing/decreasing slope gradient (the increasing/decreasing gradient), a blind curve and a sudden gradient reduction portion.

<Curvature Radius of Curve>

A curvature radius coefficient Kha is calculated on the basis of the minimum curvature radius Rm of the curve at a calculation portion A1 in FIG. 10. A curvature radius adjustment value Gyha is calculated on the basis of the minimum curvature radius Rm of the curve at a calculation portion A1' in FIG. 11. Accordingly, the smaller the minimum curvature radius Rm is, the greater value the curvature radius coefficient Kha and the curvature radius adjustment value Gyha are determined to be. As a result, the smaller the minimum curvature radius Rm of the curve is, the greater value the allowable lateral acceleration Gyo (Gyp) is determined to be, because of the following reasons. In a case where the lateral acceleration is constant while the vehicle turns the curve, the smaller a turning radius (i.e. the curvature radius Rc of the curve) is, the lower the vehicle speed becomes. The lower the vehicle speed is, the more the driver may feel secure (i.e. the higher the driver may receive a sense of security becomes). Hence, the higher the sense of security of the driver is, the greater value the allowable lateral acceleration Gyo (Gyp) (i.e. the appropriate vehicle speed Vq) may be set to be. Accordingly, the smaller the minimum curvature radius Rm of the curve is, the greater value the allowable lateral acceleration Gyo (Gyp) is determined to be, and the greater the minimum curvature radius Rm is, the smaller value the allowable lateral acceleration Gyo (Gyp) is determined to be.

<Increasing/Decreasing Slope Gradient>

An increasing/decreasing slope gradient coefficient Ktk is calculated on the basis of an increasing/decreasing slope gradient Udw at a calculation portion A2 in FIG. 10. An increasing/decreasing slope gradient adjustment value Gytk is calculated on the basis of the increasing/decreasing slope gradient Udw at a calculation portion A2' in FIG. 11. The increasing/decreasing slope gradient Udw is determined to be a positive value in a case where the road has an increasing slope (i.e. the increasing gradient). On the other hand, in a case where the road has a decreasing slope (i.e. the decreasing gradient), the increasing/decreasing slope gradient Udw is determined to be a negative value. Accordingly, the greater the increasing/decreasing slope gradient Udw (positive value) is, the greater values the increasing/decreasing slope gradient coefficient Ktk and the increasing/decreasing slope gradient adjustment value Gytk are determined to be. The smaller the increasing/decreasing slope gradient Udw (negative value) is (the greater an absolute value is), the smaller values the increasing/decreasing slope gradient coefficient Ktk and the increasing/decreasing slope gradient adjustment value Gytk are determined to be. As a result, the greater the increasing/decreasing slope gradient Udw (positive value) is, the greater value the allowable lateral acceleration Gyo (Gyp) is determined to be. On the other hand, the smaller the increasing/decreasing slope gradient Udw (negative value) is, (i.e. the greater the absolute value is), the smaller value the allowable lateral acceleration Gyo (Gyp) is determined to be.

The above-mentioned determination of the allowable lateral acceleration Gyo (Gyp) is based on the following reasons. In a case where the vehicle travels on the road having the increasing slope, the steeper the increasing slope is, the more the driver feels secure (the higher the sense of security of the driver becomes) because the vehicle speed is expected to be reduced due to the action of the gravity. Hence, in this case, the steeper the increasing gradient of the road is, the greater value the allowable lateral acceleration Gyo (Gyp) is determined to be. On the other hand, in a case where the vehicle travels on the road having the decreasing slope, the steeper the increasing slope is, the less the driver feels secure (the lower the sense of security of the driver becomes) because the vehicle speed is expected to accelerate due to the action of the gravity. Hence, in this case, the steeper the decreasing gradient of the road is, the smaller value the allowable lateral acceleration Gyo (Gyp) is determined to be.

Figure 12:
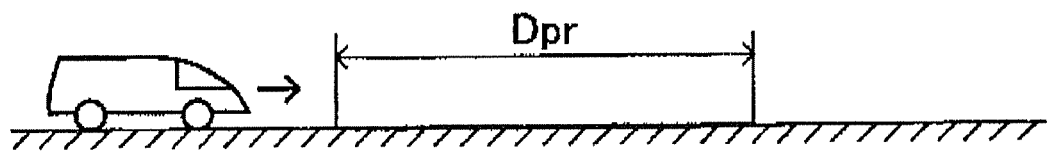
FIG. 12 is a diagram illustrating a calculation of an increasing/decreasing slope gradient on the basis of a distribution of the increasing/decreasing slope gradient within a predetermined zone existing ahead of the vehicle.

As illustrated in FIG. 12, the increasing/decreasing slope gradient Udw is not calculated on the basis of a gradient of a road surface immediately below the vehicle, but on the basis of the increasing/decreasing slope gradient within a predetermined zone Dpr existing ahead of the vehicle. For example, the increasing/decreasing slope gradient Udw may be calculated as an average value of a gradient distribution of the road surface within the zone Dpr. Alternatively, the increasing/decreasing slope gradient Udw may be calculated as a value, which is obtained by weighting the gradient by using a weighting factor. The weighting factor is set to be greater towards positions closer to the vehicle on the gradient distribution of the road surface within the zone Dpr. Accordingly, the following effects and advantages are obtained.

Figure 13:
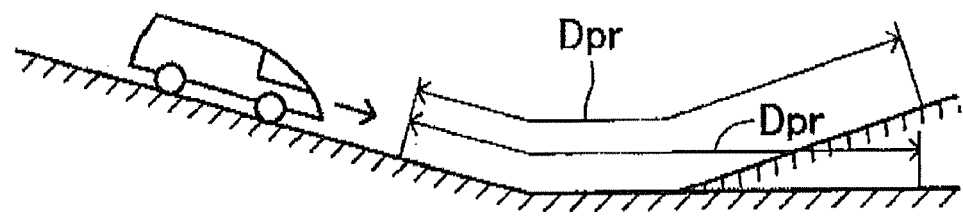
FIG. 13 is a diagram corresponding to FIG. 12 and illustrating a case where the road has a level surface or an increasing gradient continuing from the decreasing gradient.

As illustrated in FIG. 13, in a case where the vehicle travels on the road having the decreasing gradient to which a level road surface or the increasing gradient continues, the sense of security felt by the driver may be higher, comparing to a case where the decreasing gradient continues. In this case, the increasing/decreasing slope gradient Udw is calculated to be a greater value comparing to the case where the decreasing gradient continues, so that the allowable lateral acceleration Gyo (Gyp) is calculated to be a greater value.

Figure 14:
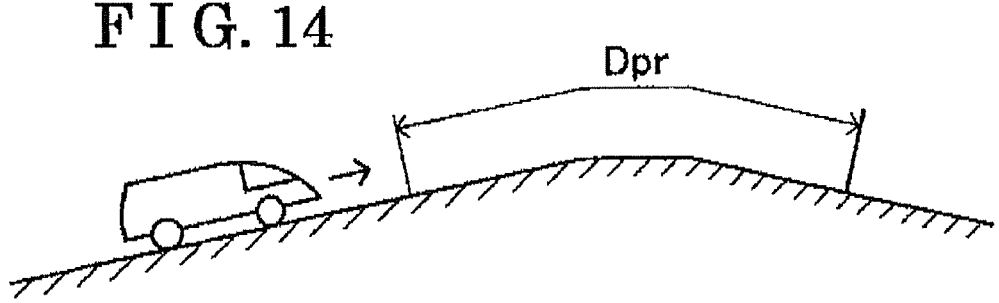
FIG. 14 is a diagram corresponding to FIG. 12 and illustrating a case where the road has the level surface or an decreasing gradient continuing from the increasing gradient.

Similarly, as illustrated in FIG. 14, in a case where the vehicle travels on the road having the increasing gradient to which the level road surface or the decreasing gradient continues, the sense of security of the driver may be lower, comparing to a case where the increasing gradient continues. In this case, the increasing/decreasing slope gradient Udw is calculated to be a smaller value comparing to the case where the increasing gradient continues, so that the allowable lateral acceleration Gyo (Gyp) is calculated to be a smaller value. As described above, even in a case where there are changes in the increasing/decreasing slope gradient ahead of the vehicle, an appropriate allowable lateral acceleration (i.e. the appropriate vehicle speed Vq) is determined in view of a level of the sense of security of the driver.

<Blind Curve>

Figure 15:
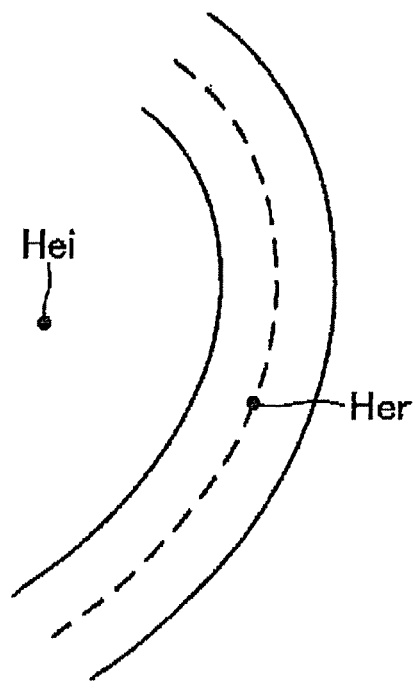
FIG. 15 is a diagram for explaining a blind curve.

A curve having poor visibility therebeyond (i.e. in the vicinity of the curve ending point), because of an existence of a shield (i.e. an object) such as a cliff, a building and the like at the inner side of the curve, is generally referred to as a "blind curve". The curve is defined as the blind curve in a case where, for example, as illustrated in FIG. 15, a difference $\Delta$Het between an elevation Hei of the inner side of the curve and an elevation Her of the curve (i.e. $\Delta$Het=Hei−Her) is equal to or greater than a predetermined value H1, or in a case where a building having a height equal to or greater than the predetermined value H1 exists at the inner side of the curve.

In the case where the curve has the poor visibility therebeyond because of the above-mentioned shield, the driver may feel less secure (i.e. the sense of security of the driver may decrease). In this case, the longer a curve length Lcv (i.e. a distance between the curve staring point and the curve ending point) is, or the longer a distance Lit of the constant curvature radius zone on the curve (see FIG. 4) is, or the smaller the minimum curvature radius Rm of the curve is, the poorer visibility beyond the curve becomes, therefore, the less the driver feels secure (i.e. the lower the sense of security becomes).

Figure 16:
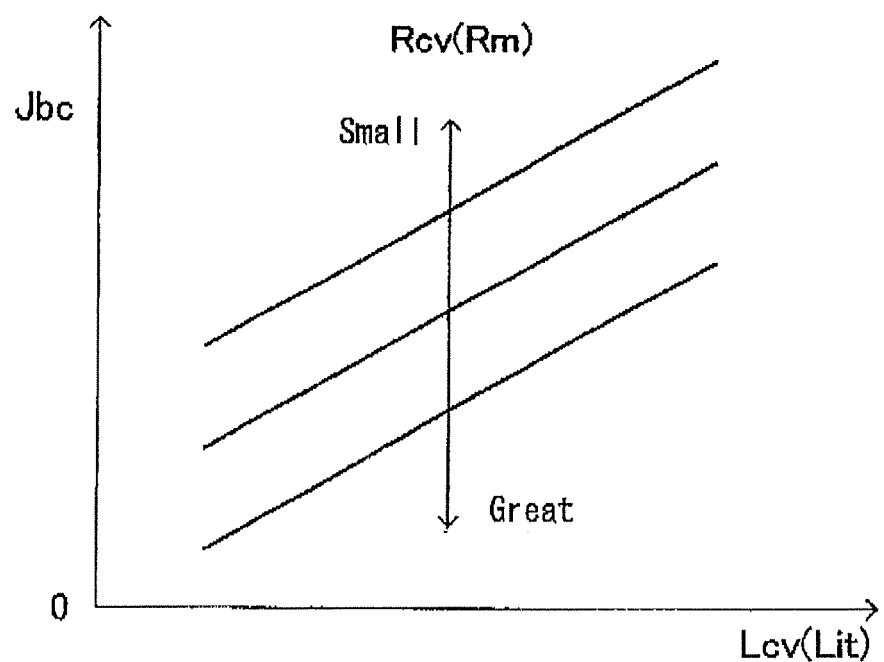
FIG. 16 is a graph illustrating a table used for seating an index, which represents a degree of poor visibility at the blind curve.

In view of the above-mentioned facts, an index Jbc, which represents a degree of poor visibility at the blind curve, is introduced. The index Jbc is determined on the basis of a table illustrated in FIG. 16 (the index obtaining means). More specifically, in a case where the minimum curvature radius Rm is constant, the longer the length of the curve Lcv (Lit) becomes, the greater value the index Jbc (>0) is set to be. On the other hand, in a case where the vehicle travels under the condition where the road having the same length of the curve Lcv (Lit), the smaller the minimum curvature radius Rm becomes (i.e. the lower the sense of security of the driver is), the greater value the index Jbc (>0) is determined to be.

In a case where the curve existing immediately ahead of the vehicle is the blind curve ($\Delta$He$\geq$H1), a blind curve coefficient Kbc is calculated on the basis of the index Jbc at a calculation portion A3 in FIG. 10, and a blind curve adjustment value Gybc is calculated on the basis of the index Jbc at a calculation portion A3' in FIG. 11. Accordingly, the greater the index Jbc is, the smaller values the blind curve coefficient Kbc and the blind curve adjustment value Gybc are determined to be. As a result, the poorer the visibility beyond the curve becomes (i.e. the lower the sense of security of the driver is), the smaller value the allowable lateral acceleration Gyo (Gyp) is determined to be. Additionally, in the case where the oncoming curve existing immediately ahead of the vehicle is not the blind curve, the blind curve coefficient Kbc is set to one (1) and the blind curve adjustment value Gybc is set to zero (0).

<Sudden Gradient Reduction Portion>

Figure 17:
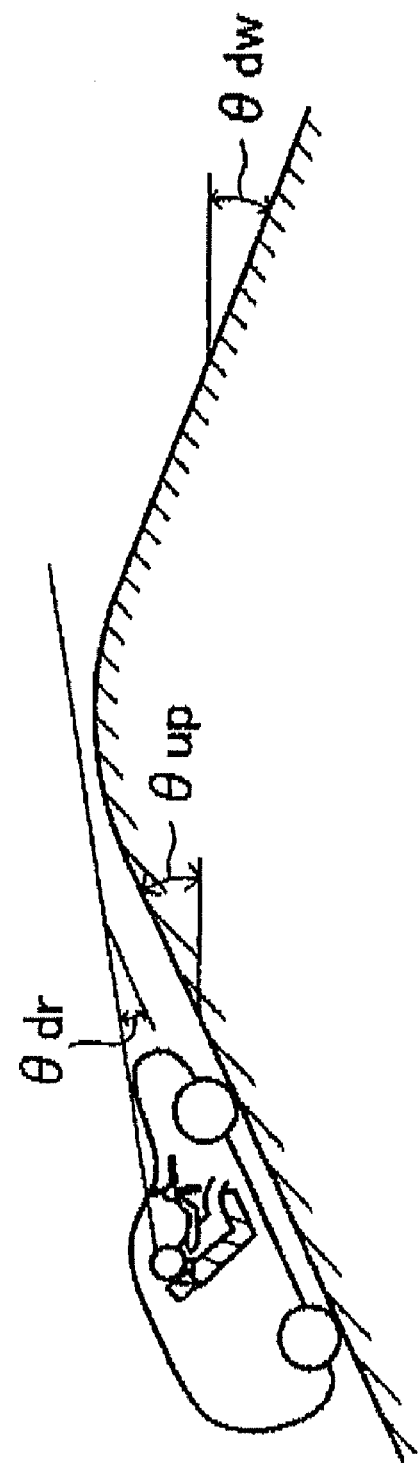
FIG. 17 is a diagram for explaining a sudden gradient reduction portion.

As illustrated in FIG. 17, with regard to a field of vision ahead of the vehicle, a lower end of the field of view of the driver in a vertical direction of the driver is determined on the basis of a relationship between a position of the driver's eye level and a position of an upper corner portion of a front end of the vehicle. An angle formed by a line corresponding to the lower end of the field of view and a line horizontal to the road surface is referred to as θdr. As illustrated in FIG. 17, in a case where, for example, the road has a portion, at which the increasing gradient (a gradient θup (positive value)) changes to the decreasing gradient (a gradient θdw (negative value)) and at which an angular variation ΔUdw of the gradient (ΔUdw=θup−θdw) is greater than the angle θdr, on the curve, the visibility beyond the sudden gradient reduction portion of the curve becomes poorer.

Accordingly, in the case where the visibility of the curve is poor because of the gradient sudden reduction portion, the driver may feel less secure (i.e. the sense of security of the driver may decrease). In this case, the greater the angular variation ΔUdw of the gradient at the sudden gradient reduction portion is, the less the driver may feel secure (i.e. the lower the sense of security of the driver becomes) because the visibility beyond the curve is poor.

Considering the above-mentioned facts, in a case where the sudden gradient reduction portion exists on the road (i.e. ΔUdw>θdr), a sudden gradient reduction coefficient Kmt is calculated at a calculation portion A4 in FIG. 10 on the basis of the angular variation ΔUdw, and a sudden gradient reduction adjustment value Gymt is calculated at a calculation portion A4' in FIG. 11 on the basis of the angular variation ΔUdw. Accordingly, the greater the angular variation ΔUdw (>θdr) is, the smaller values the sudden gradient reduction coefficient Kmt and the sudden gradient reduction adjustment value Gymt are determined to be. As a result, the poorer the visibility beyond the curve becomes due to the existence of the sudden gradient reduction portion (i.e. the less the driver feels secure), the smaller value the allowable lateral acceleration Gyo (Gyp) is determined to be. Additionally, in a case where the road does not have the sudden gradient reduction portion, the sudden gradient reduction coefficient Kmt is set to one (Kmt=1) and the sudden gradient reduction adjustment value Gymt is set to zero (Gymt=0).

According to the motion control device of the embodiment, the allowable lateral acceleration Gyo (Gyp) is calculated in view of the curvature radius Rc of the curve, the increasing/decreasing slope gradient (the increasing/decreasing gradient), the blind curve and the sudden gradient reduction portion, which influence the sense of security of the driver. Accordingly, the appropriate vehicle speed Vq is determined on the basis of the allowable lateral acceleration Gyo (Gyp) and the curvature radius Rc of the curve (see FIG. 6). Then, once the above-described speed reduction control starting condition is satisfied, the speed reduction control is started and executed without being influenced by the acceleration/deceleration operation performed by the driver, so that the vehicle speed Vx is reduced down to the appropriate vehicle speed Vq.

Accordingly, the driver may not feel discomfort while the speed reduction control is executed, because the allowable lateral acceleration Gyo (Gyp) (i.e. the appropriate vehicle speed Vq) is determined in view of the sense of security of the driver when the vehicle advances to the curve.

Further, the present invention is not limited to the above-described embodiment, and various modification and changes may be applied without departing from the spirit of the present invention. For example, in the above-described embodiment, the appropriate vehicle speed Vq is determined by using the allowable lateral acceleration Gyo (Gyp) that is calculated in view of the sense of security of the driver. However, the appropriate vehicle speed Vq may be directly determined in view of the sense of security of the driver but without using the allowable lateral acceleration Gyo (Gyp).

In this case, for example, the appropriate vehicle speed Vq is determined in the following manner: firstly, a reference value of the appropriate vehicle speed (which is a value corresponding to the allowable lateral acceleration reference value Gya) is determined on the basis of the curvature radius Rc of the curve (i.e. the minimum curvature radius Rm), and then, the reference value of the appropriate vehicle speed is adjusted by the adjustment coefficient indicated in FIG. 10 (specifically, Ktk, Kbc, Kmt) or by the adjustment value indicated in FIG. 11 (specifically, Gytk, Gybc, Gymt).

Further, in the above-described embodiment, the allowable lateral acceleration is calculated in view of the four adjustment coefficients indicated in FIG. 10 or in view of four adjustment values indicated in FIG. 11. However, the allowable lateral acceleration may be calculated in view of any one of, two of, or three of the four adjustment coefficients indicated in FIG. 10 or the four of adjustment values indicated in FIG. 11.

Further, a point (zone) where the shield (the cliff, the building and the like) exists at the inner side of the curve may be preliminarily memorized in the map information as the blind curve point (zone), so that the appropriate vehicle speed Vq (or, the allowable acceleration speed Gyo (Gyp)) is determined (adjusted) to be a smaller value on the basis of the memorized map information when the vehicle passes through the blind curve point (zone). A point (zone) where the visibility beyond the curve is poor because of the sudden gradient reduction portion may be preliminarily memorized in the map information as the sudden gradient reduction point (zone), so that the appropriate vehicle speed Vq (or the allowable acceleration speed Gyo (Gyp)) is determined (adjusted) to be a smaller value on the basis of the memorized map information when the vehicle passes through the sudden gradient reduction point (zone). Accordingly, by preliminarily memorizing the point (zone) at which the visibility beyond the curve is poor at the map information, the calculation process of determining the degree of the poor visibility may be omitted and the calculation process may be simplified.

Additionally, in the embodiment, the above-described curve travel assistance control is started and executed independently of the acceleration/deceleration operation by the driver. However, the motion control device of the embodiment may be modified so that the curve travel assistance control is started and executed only in the case where the driver conducts the deceleration operation. It is determined that the deceleration operation is conducted by the driver in a case where an acceleration pedal operation variable As, detected by the acceleration operation sensor AS, becomes equal to or less than a predetermined value (including zero (0)), and in a case there a brake pedal operation variable Bs, detected by the brake operation sensor BS, becomes equal to or greater than a predetermined value (not including zero (0)). Accordingly, in the case where the curve travel assistance control is started and executed only in the case where the driver conducts the deceleration operation, the acceleration limit control executed after the deceleration control may be omitted.

The ECU of the device includes therein the above-described gradient obtaining means and the index obtaining means.

According to the embodiment, the motion control device for the vehicle includes the vehicle speed obtaining means (215), the curvature obtaining means (220), the position obtaining means (225), the determination means (230, 235) and the speed reduction control means (255). In this specification, a point closer to the vehicle relative to a predetermined point may be referred to as 'a front side'. A point farther from the vehicle relative to the predetermined point may be referred to as 'a back side'. Further, a term 'passing of the curve starting point' may be expressed as 'advancing to the curve'. A term 'passing of the curve ending point' may be expressed as 'exiting from the curve'.

The vehicle speed obtaining means (215) obtains a speed (Vx) of the vehicle (a vehicle speed (Vx)) by using one of the known methods such as a method using an output of a wheel speed sensor (WS**) and the like.

The curvature obtaining means (220) obtains a bending grade of the curve (a degree of the curve bend) existing ahead of the vehicle on the traveling road. A term 'the bending grade of the curve is great' means that a grade of bend of the curve is great in a plane parallel to (flush with) the road surface (a left/right direction in a horizontal plane). For example, the bending grade of the curve being great means that a curvature is great, a curvature radius (=1/curvature) is small, a minimum curvature radius is small and the like. The bend grade may be obtained from the road information stored in the navigation device, which is mounted on the vehicle.

The position obtaining means (225) obtains a relative position (Lv) of the vehicle relative to the curve. The relative position (Lv) may be obtained from, for example, a position of the vehicle obtained from road information memorized in the navigation device, which is mounted on the vehicle, and the global positioning system, which is mounted on the navigation device.

The determination means (230, 235) determines the appropriate vehicle speed (Vq) for the vehicle passing through the curve, on the basis of the bending grade (Rc, Rm) of the curve. The appropriate vehicle speed (Vq) is a speed appropriate for the vehicle to travel through a reference point, which exists on the curve, i.e. between the curve starting point (Ci) and the curve ending point (Cd).

The reference point (Pcr) is, for example, selected as an ending point (Cs) of an advance transition curve zone on an entrance side of the curve (i.e. a starting point of a constant curvature radius zone), or a point existing the closest to the vehicle relative to the ending point (Cs). Further, for example, the greater the minimum curvature radius (Rm) of the curve is, the greater value the appropriate vehicle speed (Vq) is set to be.

The speed reduction control means (255) executes a speed reduction control for reducing the speed of the vehicle (Vx) so that the vehicle passes through the curve at the appropriate vehicle speed. For example, the speed reduction control is started when a predetermined start condition is satisfied, and the speed reduction control is ended when the vehicle speed (Vx) reaches a predetermined range (Hn) including the appropriate vehicle speed (Vq). The speed reduction control may be started without being influenced by the deceleration operation (a brake operation) of the driver. The speed reduction of the vehicle may be achieved by, for example, the wheel brake, the reduction of an output of the drive source, the downshift of the transmission (i.e. moving a shift stage towards a lower side, increasing a reduction gear ratio and the like) and the like.

According to the motion control device relating to the embodiment, the motion control device includes the gradient obtaining means (220) for obtaining the gradient (Udw) of the road existing on the curve in a traveling direction of the vehicle, wherein the determination means (230, 235) determines the appropriate vehicle speed (Vq) on the basis of the gradient (Udw) of the road in addition to the bending grade (Rc, Rm) of the curve.

The determination means (230, 235) may be modified so that the determination means determines the appropriate vehicle speed (Vq) by modifying the appropriate vehicle speed reference value, which is determined based only on the bending grade (Rc, Rm) of the curve, on the basis of the gradient (Udw) of the road on the curve.

Accordingly, the appropriate vehicle speed (Vq) is determined on the basis of the gradient (Udw) of the road, which greatly affects the sense of security of the driver when the vehicle advances to the curve. In other words, the appropriate vehicle speed (Vq) is determined in view of the sense of security of the driver, and the speed reduction control is executed on the basis of the determined appropriate vehicle speed (Vq).

According to the embodiment, the electronic control unit (ECU) determines the appropriate vehicle speed (Vq) at steps 230 and 235 in the manner where the greater the increasing gradient of the road, which is obtained by the gradient obtaining means (220), is, the greater value the appropriate vehicle speed (Vq) is determined to be (A2, A2'), and/or the greater the decreasing gradient of the road, which is obtained by the gradient obtaining means (220), is, the smaller value the appropriate vehicle speed (Vq) is determined to be (A2, A2').

Accordingly, in the case where the curve has the increasing gradient of the road, the appropriate vehicle speed (Vq) may be determined to be higher because the driver may feel more secure (i.e. the sense of security of the driver is higher). On the other hand, in the case where the curve has the decreasing gradient of the road, the appropriate vehicle speed (Vq) may be preferable to be determined to be lower because the driver feels less secure (i.e. the sense of security of the driver is lower). The motion control device for the vehicle is configured on the basis of the above-described findings. More specifically, the appropriate vehicle speed (Vq) is determined in the appropriate view of the sense of security of the driver that fluctuates depending on the gradient on the curve (an acceleration/deceleration action based on the gravity).

According to the embodiment, the motion control device includes an index obtaining means (220) for obtaining an index (Jbc, ΔUdw), which indicates a degree of poor visibility of the curve to a driver, wherein the motion control device is configured so that the determination means (230, 235) determines the appropriate vehicle speed (Vq) on the basis of the index (Jbc, ΔUdw) in addition to the bending grade (Rc, Rm) of the curve.

The motion control device may be modified so that the determination means (230, 235) determines the appropriate vehicle speed (Vq) by modifying the appropriate vehicle speed reference value, which is determined based only on the bending grade (Rc, Rm) of the curve, on the basis of the index (Jbc, ΔUdw).

Accordingly, the appropriate vehicle speed (Vq) is determined on the basis of the poor visibility of the curve that greatly affects the sense of security the driver feels when the vehicle advances to the curve. In other words, the appropriate vehicle speed (Vq) is determined in view of the sense of security of the driver, and the speed reduction control is executed on the basis of the calculated appropriate vehicle speed (Vq).

According to the embodiment, the electronic control unit (ECU) determines the appropriate vehicle speed (Vq) at steps 230 and 235 in the manner where the greater the degree of the poor visibility of the curve, which is indicated by the index (Jbc, ΔUdw), is, the smaller value the appropriate vehicle speed (Vq) is determined to be.

In the case where the curve has the poor visibility, the appropriate vehicle speed (Vq) may be preferable to be determined lower because the sense of security of the driver is low. The motion control device for the vehicle is configured on the basis of the above-described findings. Accordingly, the appropriate vehicle speed (Vq) may be determined in the appropriate view of the low sense of security of the driver caused due to the poor visibility of the curve.

According to the embodiment, the electronic control unit (ECU) (the index obtaining means (220)) obtains the length (Lcv) of the curve and/or the bending grade (Rc, Rm) of the curve as the index (Jbc, ΔUdw) in the case where the elevation (Hei) of the inner side of the curve relative to the elevation (Her) of the curve is equal to or greater than the predetermined value (H1), or in the case where the object (e.g. the building) having the height equal to or higher than the predetermined value (H1) exists at the inner side of the curve, and wherein the electronic control limit (ECU) determines the appropriate vehicle speed (Vq) at steps 230 and 235 in the manner where the longer the lend of the curve is, the smaller value the appropriate vehicle speed (Vq) is determined to be, and/or the greater the bending grade (Rc, Rm) of the curve is, the smaller value the appropriate vehicle speed (Vq) is determined to be in the case where the elevation (Hei) of the inner side of the curve relative to the elevation (Her) of the curve is equal to or greater than the predetermined value (H1), or in the case where the object (e.g. the building) having the height equal to or higher than the predetermined value (H1) exists at the inner side of the curve (A3, A3').

In the case where the curve has the poor visibility because of the blind curve, the longer the length of the curve (e.g. the distance between the curve starting point (Ci) and the curve ending point (Cd)) is, or the greater the bending grade (Rc, Rm) of the curve is (e.g. the smaller the minimum curvature radius (Rm) is), the less the driver feels secure (i.e. the lower the sense of security of the driver becomes). The motion control device for the vehicle is configured based on the above-described findings. Accordingly, the appropriate vehicle speed (Vq) may be determined in the appropriate view of the low sense of security of the driver caused due to the blind curve.

According to the embodiment, the electronic control unit (ECU) (the index obtaining means (220)) obtains the angular variation (ΔUdw=θup−θdw) of a gradient of the sudden gradient reduction portion as the index (Jbc, ΔUdw) in the case where the sudden gradient reduction portion exists on the curve, the sudden gradient reduction portion is a portion whose gradient changes by equal to or more than the predetermined angle (θdr) in a decreasing direction on the curve. Further, the electronic control unit (ECU) determines the appropriate vehicle speed (Vq) at steps 230 and 235 in the manner where the greater the angular variation (ΔUdw=θup−θdw) of the gradient of the sudden gradient reduction portion is, the smaller value the appropriate vehicle speed (Vq) is determined to be in the case where the sudden gradient reduction portion exists on the curve (A4, A4').

If the sudden gradient reduction portion exists on the curve, the visibility of the curve becomes poorer. Accordingly, in the case where the visibility of the curve is poor because of the sudden gradient reduction portion, the greater the angular variation (ΔUdw) of the gradient of the sudden gradient reduction portion is, the less the driver may feel secure (i.e. the lower the sense of security of the driver may becomes). The motion control device for the vehicle is configured based on the above-described findings. Accordingly, the appropriate vehicle speed (Vq) may be determined in the appropriate view of the low sense of the security of the driver caused due to the sudden gradient reduction portion.

According to the embodiment, the electronic control unit (ECU) calculates the allowable lateral acceleration, which is an allowable value of the lateral acceleration acting on the vehicle when passing through the curve being calculated by the calculation means (230), and determines the appropriate vehicle speed (Vq) on the basis of the bending grade (Rc, Rm) of the curve and the allowable lateral acceleration (Gyo, Gyp) by the determination means (235).

In this case, the calculation means (230) is configured so as to calculate the allowable lateral acceleration (Gyo, Gyp) on the basis of the bending grade (Rc, Rm) of the curve. The allowable lateral acceleration (Gyo, Gyp) may be calculated by modifying a pre-set allowable lateral acceleration reference value on the basis of the bending grade (Rc, Rm) of the curve.

Accordingly, the appropriate vehicle speed (Vq) is determined on the basis of the bending grade (Rc, Rm) of the curve, which greatly affects the sense of security the driver feels when the vehicle advances to the curve. In other words, the allowable lateral acceleration (Gyo, Gyp) (i.e. the appropriate vehicle speed Vq)) is determined in view of the sense of security of the driver, and the deceleration control is executed on the basis of the calculated allowable lateral acceleration (Gyo, Gyp).

According to the embodiment, the electronic control unit (CCU) calculates the allowable lateral acceleration (Gyo, Gyp) at step 230 in the manner where the greater the bending grade (Rc, Rm) of the curve is, the greater value the allowable lateral acceleration (Gyo, Gyp) is calculated to be (A1, A1'), and/or the smaller the bending grade (Rc, Rm) of the curve is, the smaller value the allowable lateral acceleration (Gyo, Gyp) is calculated to be (A1, A1').

In a case where the vehicle moves with receiving a predetermined lateral acceleration, the smaller the curvature radius of the curve is, the lower the vehicle speed becomes. The lower the vehicle speed is, the more the driver may feel secure (i.e. the greater the sense of security of the driver becomes). The motion control device for the vehicle is configured based on the above-described findings. Accordingly, the allowable lateral acceleration (Gyo, Gyp) (i.e. the appropriate vehicle speed (Vq)) may be determined in the appropriate view of the sense of security of the driver that fluctuates depending on the bending grade (Rc, Rm) of the curve.

According to the embodiment, the calculation means (230) in the electronic control unit (ECU) is configured so as to calculate the allowable lateral acceleration (Gyo, Gyp) on the basis of the gradient (Udw) of the road. The allowable lateral acceleration (Gyo, Gyp) may be calculated by modifying the pre-set allowable lateral acceleration reference value on the basis of the gradient (Udw) of the road.

According to the embodiment, the electronic control unit (ECU) determines the allowable lateral acceleration (Gyo, Gyp) at step 230 in the manner where the greater the increasing gradient of the road, which is obtained by the gradient obtaining means, is, the greater value the allowable lateral acceleration (Gyo, Gyp) is determined to be (A2, A2'), and/or the greater an decreasing gradient of the road, which is obtained by the gradient obtaining means, is, the smaller value the allowable lateral acceleration (Gyo, Gyp) is determined to be (A2, A2').

Accordingly, the allowable lateral acceleration (Gyo, Gyp) (i.e. the appropriate vehicle speed (Vq)) may be determined in the appropriate view of the sense of security of the driver that fluctuates depending on the gradient of the road on the curve (the acceleration/deceleration action based on the gravity).

According to the embodiment, the calculation means (230) in the electronic control unit (ECU) may be configured to as to calculate the allowable lateral acceleration (Gyo, Gyp) on the basis of the index (Jbc, ΔUdw) obtained by the index obtaining means (220). The allowable lateral acceleration (Gyo, Gyp) may be calculated by modifying the pre-set allowable lateral acceleration reference value on the basis of the index (Jbc, ΔUdw) obtained by the index obtaining means (220).

According to the embodiment, the electronic control unit (ECU) determines the allowable lateral acceleration (Gyo, Gyp) at step 230 in the manner where the greater the degree of the poor visibility of the curve, which is indicated by the index (Jbc, ΔUdw), is, the smaller value the allowable lateral acceleration (Gyo, Gyp) is determined to be (A3, A3', A4, A4').

Accordingly, the allowable lateral acceleration (Gyo, Gyp) (i.e. the appropriate vehicle speed (Vq)) may be determined in the appropriate view of the low sense of security of the driver caused due to the poor visibility of the curve.

According to the embodiment, the electronic control unit (ECU) (the index obtaining means (220)) obtains the length (Lcv) of the curve and/or the bending grade (Rc, Rm) of the curve as the index (Jbc, ΔUdw) in the case where the elevation (Hei) of the inner side of the curve relative to the elevation (Her) of the curve is equal to or greater than the predetermined value (H1), or in the case where the object (e.g. the building) having the height equal to or higher than the predetermined value (H1) exists at the inner side of the curve. Further, the electronic control unit (ECU) calculates the allowable lateral acceleration (Gyo, Gyp) at step 230 in the manner where the longer the length of the curve is, the smaller value the allowable lateral acceleration (Gyo, Gyp) is calculated to be, and/or the greater the bending grade (Rc, Rm) of the curve is, the smaller value the allowable lateral acceleration (Gyo, Gyp) is calculated to be in the case where the elevation (Hei) of the inner side of the curve relative to the elevation (Her) of the curve is equal to or greater than the predetermined value (H1), or in the case where the object (e.g. the building) having the height equal to or higher than the predetermined value (H1) exists at the inner side of the curve (A3, A3').

Accordingly, the allowable lateral acceleration (Gyo, Gyp) (i.e. the appropriate vehicle speed (Vq)) may be determined in the appropriate view of the low sense of security of the driver caused due to the blind curve.

According to the embodiment, the electronic control unit (EUC) (the index obtaining means (220)) obtains the angular variation (ΔUdw=θup−θdw) of the gradient of the sudden gradient reduction portion as the index (Jbc, ΔUdw) in the case where the sudden gradient reduction portion exists on the curve, the sudden gradient reduction portion is the portion whose gradient changes for equal to or more than a predetermined angle (θdr) in the decreasing direction on the curve. Further, the electronic control unit (ECU) calculates the allowable lateral acceleration (Gyo, Gyp) at step 230 in the manner where the greater the angular variation (ΔUdw=θup−θdw) of the gradient of the sudden gradient reduction portion is, the smaller value the allowable lateral acceleration (Gyo, Gyp) is calculated to be in the case where the sudden gradient reduction portion exists on the curve (A4, A4'), Accordingly, the allowable lateral acceleration (Gyo, Gyp) (i.e. the appropriate vehicle speed (Vq)) may be determined in the appropriate view of the low sense of security of the driver caused due to the sudden gradient reduction portion.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A motion control device for a vehicle comprising:
a vehicle speed obtaining means for obtaining a speed of the vehicle;
a curvature obtaining means for obtaining a bending grade of a curve existing ahead of the vehicle on a road on which the vehicle travels;
a position obtaining means for obtaining a relative position of the vehicle relative to the curve;
a determination means for determining an appropriate vehicle speed for the vehicle passing through the curve on the basis of the bending grade of the curve;
a speed reduction control means for executing a speed reduction control for reducing the speed of the vehicle on the basis of the speed of the vehicle and the relative position so that the vehicle passes though the curve at the appropriate vehicle speed; and
a gradient obtaining means for obtaining a gradient of the road on the curve in a traveling direction of the vehicle, wherein
the determination means determines the appropriate vehicle speed on the basis of a change of the gradient of the road within a predetermined zone existing ahead of the vehicle obtained on a basis of the gradient of the road in addition to the bending grade of the curve;
the determination means determines the appropriate vehicle speed in a manner where the greater an increasing gradient of the road, which is obtained by the gradient obtaining means, is, the greater value the appropriate vehicle speed is determined to be, and/or the greater a decreasing gradient of the road, which is obtained by the gradient obtaining means, is, the smaller value the appropriate vehicle speed is determined to be; and
the determination means determines the appropriate vehicle speed to be a greater value in a case where the vehicle travels on the road having a decreasing gradient to which a level road surface or an increasing gradient continues within the predetermined zone compared to a case where the decreasing gradient of the road continues over the predetermined zone.

2. The motion control device according to claim 1, further comprising a calculation means for calculating an allowable lateral acceleration, which is an allowable value of a lateral acceleration acting on the vehicle when passing through the curve, the calculation means calculating the allowable lateral acceleration by modifying a pre-set allowable lateral acceleration reference value on the basis of the gradient of the road, wherein the determination means determines the appropriate vehicle speed for the vehicle passing through the curve on the basis of the bending grade of the curve and the allowable lateral acceleration.

3. The motion control device according to claim 2, wherein the calculation means determines the allowable lateral acceleration in a manner where the greater an increasing gradient of the road, which is obtained by the gradient obtaining means, is, the greater value the allowable lateral acceleration is determined to be, and/or the greater a decreasing gradient of the road, which is obtained by the gradient obtaining means, is, the smaller value the allowable lateral acceleration is determined to be.

4. A motion control device for a vehicle comprising:
- a vehicle speed obtaining means for obtaining a speed of the vehicle;
- a curvature obtaining means for obtaining a bending grade of a curve existing ahead of the vehicle on a road on which the vehicle travels;
- a position obtaining means for obtaining a relative position of the vehicle relative to the curve;
- a determination means for determining an appropriate vehicle speed for the vehicle passing through the curve on the basis of the bending grade of the curve;
- a speed reduction control means for executing a speed reduction control for reducing the speed of the vehicle on the basis of the speed of the vehicle and the relative position so that the vehicle passes though the curve at the appropriate vehicle speed; and
- a gradient obtaining means for obtaining a gradient of the road on the curve in a traveling direction of the vehicle, wherein
  - the determination means determines the appropriate vehicle speed on the basis of a change of the gradient of the road within a predetermined zone existing ahead of the vehicle obtained on a basis of the gradient of the road in addition to the bending grade of the curve;
  - the determination means determines the appropriate vehicle speed in a manner where the greater an increasing gradient of the road, which is obtained by the gradient obtaining means, is, the greater value the appropriate vehicle speed is determined to be, and/or the greater a decreasing gradient of the road, which is obtained by the gradient obtaining means, is, the smaller value the appropriate vehicle speed is determined to be; and
  - the determination means determines the appropriate vehicle speed to be a smaller value in a case wherein the vehicle travels on the road having an increasing gradient to which a level road surface or a decreasing gradient continues within the predetermined zone compared to a case where the increasing gradient continues over the predetermined zone.

5. The motion control device according to claim 4, further comprising a calculation means for calculating an allowable lateral acceleration, which is an allowable value of a lateral acceleration acting on the vehicle when passing through the curve, the calculation means calculating the allowable lateral acceleration by modifying a pre-set allowable lateral acceleration reference value on the basis of the gradient of the road, wherein the determination means determines the appropriate vehicle speed for the vehicle passing through the curve on the basis of the bending grade of the curve and the allowable lateral acceleration.

6. The motion control device according to claim 5, wherein the calculation means determines the allowable lateral acceleration in a manner where the greater an increasing gradient of the road, which is obtained by the gradient obtaining means, is, the greater value the allowable lateral acceleration is determined to be, and/or the greater a decreasing gradient of the road, which is obtained by the gradient obtaining means, is, the smaller value the allowable lateral acceleration is determined to be.

* * * * *